United States Patent
Lee et al.

(10) Patent No.: US 11,950,267 B2
(45) Date of Patent: Apr. 2, 2024

(54) MECHANISMS FOR TRANSMISSION OF MULTIPLE DOWNLINK CONTROL INFORMATION

(71) Applicant: Intel Corporation, Santa Clara, CA (US)

(72) Inventors: Dae Won Lee, Portland, OR (US); Yingyang Li, Beijing (CN); Gang Xiong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 17/210,493

(22) Filed: Mar. 23, 2021

(65) Prior Publication Data

US 2021/0212072 A1    Jul. 8, 2021

Related U.S. Application Data

(60) Provisional application No. 63/110,883, filed on Nov. 6, 2020, provisional application No. 62/994,050, filed on Mar. 24, 2020.

(51) Int. Cl.
*H04W 72/23* (2023.01)
*H04L 1/00* (2006.01)
*H04L 5/00* (2006.01)
*H04L 27/26* (2006.01)
*H04W 72/53* (2023.01)
*H04W 76/27* (2018.01)

(52) U.S. Cl.
CPC ........... *H04W 72/53* (2023.01); *H04L 1/0061* (2013.01); *H04L 5/0051* (2013.01); *H04L 27/2636* (2013.01); *H04W 72/23* (2023.01); *H04W 76/27* (2018.02)

(58) Field of Classification Search
CPC ..... H04W 72/53; H04W 72/23; H04W 76/27; H04L 1/0061; H04L 5/0051; H04L 27/2636
See application file for complete search history.

(56) References Cited

U.S. PATENT DOCUMENTS

| | | | |
|---|---|---|---|
| 2020/0053705 A1* | 2/2020 | Hwang | H04W 52/146 |
| 2020/0153581 A1* | 5/2020 | Tsai | H04B 7/0691 |
| 2021/0045121 A1* | 2/2021 | Kim | H04W 72/1263 |
| 2021/0153205 A1* | 5/2021 | Takeda | H04W 72/56 |
| 2021/0168844 A1* | 6/2021 | Takeda | H04W 72/0446 |
| 2021/0234640 A1* | 7/2021 | Cirik | H04L 1/1819 |
| 2021/0344455 A1* | 11/2021 | Choi | H04L 1/1614 |
| 2022/0217736 A1* | 7/2022 | Taherzadeh Boroujeni | H04L 5/0094 |
| 2022/0239442 A1* | 7/2022 | Yoshioka | H04W 28/18 |

* cited by examiner

Primary Examiner — Kent Krueger
(74) Attorney, Agent, or Firm — East IP P.C.

(57) ABSTRACT

The disclosure provides mechanisms for transmission of multiple DCIs. An apparatus for an AN includes RF interface circuitry; and processing circuitry coupled with the interface circuitry and configured to: multiplex one or more PDCCHs carrying DCI for a UE in a TDM manner; perform a resource mapping to map the multiplexed one or more PDCCHs into frequency and time resources in a CORESET; and provide the multiplexed one or more PDCCHs to the RF interface circuitry for transmission to the UE with the frequency and time resources in the CORESET.

23 Claims, 13 Drawing Sheets

1000

Decode one or more PDCCHs multiplexed in a TDM manner and transmitted with frequency and time resources in a CORESET  /1010

Identify one or more DCIs carried in the one or more PDCCHs  /1020

FIG. 10

MECHANISMS FOR TRANSMISSION OF MULTIPLE DOWNLINK CONTROL INFORMATION

TECHNICAL FIELD

Embodiments described herein generally relate to wireless communication, and more specifically to mechanisms for transmission of multiple downlink control information (DCI).

BACKGROUND

Mobile communication has evolved significantly from early voice systems to today's highly sophisticated integrated communication platform. The next generation wireless communication system (e.g. a 5G or new radio (NR) system) will provide access to information and sharing of data anywhere and anytime by various users and applications. The NR system is expected to be a unified system that targets to meet vastly different and sometime conflicting performance dimensions and services. Such diverse multi-dimensional requirements are driven by different services and applications. In general, the NR system will evolve based on 3GPP LTE-Advanced with additional potential new Radio Access Technologies (RATs) to enrich people lives with better, simple and seamless wireless connectivity solutions. The NR system will enable everything connected by wireless and deliver fast, rich contents and services.

In 3GPP technical specifications Release 15 for 5G/NR systems (simply referred to as "NR Rel-15" hereinafter), system design is targeted for carrier frequencies up to 52.6 GHz with a waveform choice of Cyclic Prefix-Orthogonal Frequency-Division Multiplexing (CP-OFDM) for downlink (DL) and uplink (UL) transmissions and additionally Discrete Fourier Transform-spread-OFDM (DFT-s-OFDM) for UL transmission. However, for carrier frequencies above 52.6 GHz, it is envisioned that a single carrier based waveform is needed in order to handle issues including low power amplifier (PA) efficiency and large phase noise.

BRIEF DESCRIPTION OF THE DRAWINGS

The various advantages of the embodiments will become apparent to one skilled in the art by reading the following specification and appended claims, and by referencing the following drawings, in which:

FIG. 10 shows an example procedure to be performed at a User Equipment (UE) according to some embodiments of the present disclosure;

DETAILED DESCRIPTION

Figure 1:
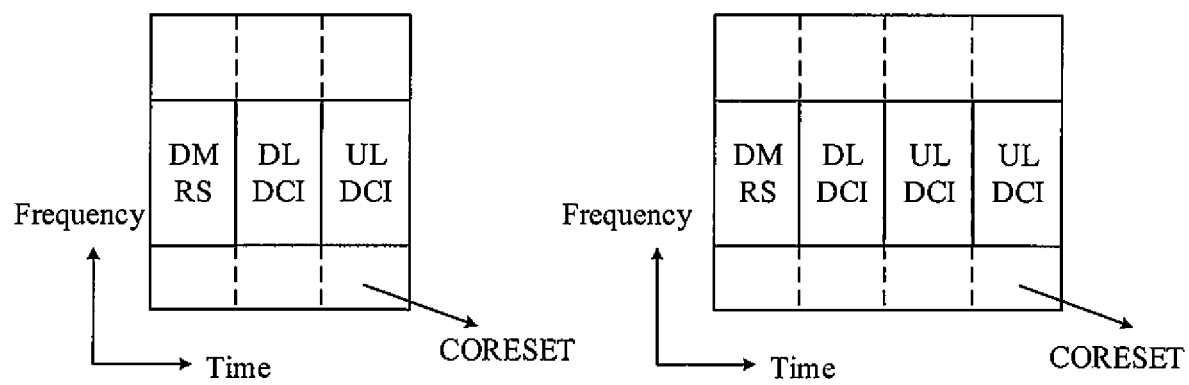
FIG. 1 shows example configurations of a control resource set (CORESET) of multiplexing multiple physical downlink control channels (PDCCHs) in a time division multiplexing (TDM) manner with a same frequency resource according to some embodiments of the present disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well-known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

In the NR Rel-15, a control resource set (CORESET) is defined as a set of resource element groups (REGs) with one or more symbol durations under a given numerology within which a User Equipment (UE) attempts to blindly decode DCIs. For the PDCCH, a REG is defined as a physical resource block (PRB) with one OFDM symbol and one control channel element (CCE) includes 6 REGs. Further, a PDCCH candidate consists of a set of CCEs and can be mapped contiguously or non-contiguously in frequency. CCE-to-REG mapping can be either localized or distributed in the frequency domain. However, for a given CORESET, only one CCE-to-REG mapping is configured. When the distributed CCE-to-REG mapping is employed, a block interleaver is used to distribute the REGs within one CCE in frequency resources in the CORESET.

In the NR Rel-15, for a given bandwidth part (BWP) in a cell, the maximum number of CORESETs for a UE is 3. In addition, a control search space is associated with a single CORESET and multiple search spaces can be associated with a CORESET. In this case, for a given CORESET, different search spaces (e.g., a common search space and a UE-specific search space) can have different periodicities for a UE to monitor. Further, the maximum number of search space sets configurable for a BWP in a cell for a UE is 10.

In the NR Rel-15, a CP-OFDM waveform is applied for the transmission of PDCCHs, and multiple PDCCHs can be multiplexed in a frequency division multiplexing (FDM) manner. However, for a system operating above a carrier frequency of 52.6 GHz, when a single carrier waveform including a DFT-s-OFDM waveform is applied for DL transmission, it is envisioned that multiplexing multiple PDCCHs in a TDM manner may be more desirable as the single carrier property can be maintained.

Further, in the NR Rel-15, for a given slot, a UE can receive two unicast DCIs scheduling DL transmission and one unicast DCI scheduling UL transmission per scheduled component carrier (CC). To support multiple DL DCIs and UL DCIs for unicast transmission, certain mechanisms may need to be considered when the DFT-s-OFDM waveform is applied for PDCCH transmission.

In various embodiments of the present disclosure, mechanisms for transmission of multiple DCIs are proposed. For example, these mechanisms may be used to transmit multiple DCIs with the DFT-s-OFDM waveform for a system operating above the carrier frequency of 52.6 GHz. The embodiments in the present disclosure will be described and illustrated below with respect to a single UE, but it should be understood that the embodiments can be straightforwardly extended to perform the transmission of multiple DCIs for multiple UEs.

According to some embodiments of the present disclosure, multiple PDCCHs carrying one or more DL and/or UL DCIs for a given UE may be multiplexed in a TDM manner. More specifically, different PDCCHs carrying one or more DL and/or UL DCIs may be transmitted in different symbols in a CORESET. In this case, a frequency first mapping may be employed for the transmission of PDCCHs for the UE in the CORESET.

Furthermore, a shared Demodulation reference signal (DMRS) can be used for the transmission of different PDCCHs carrying one or more DL and/or UL DCIs for the UE, which can help in reducing the DMRS overhead. The frequency resource allocated to the DMRS may be the same as the frequency resource allocated to each of the multiple PDCCHs. Alternatively, the frequency resource for the DMRS may include the frequency resources of the multiple PDCCHs. In an example, a wideband DMRS may be transmitted, where the DMRS may be transmitted in the first symbol in the CORESET and span all the frequency resource in the CORESET. Alternatively, the frequency resource for the DMRS may be the same as or proportional to a frequency resource allocated to a PDCCH with a largest aggregation level among the multiple PDCCHs.

In some embodiments of the present disclosure, multiple PDCCHs may be allocated in a same frequency resource in the CORESET for the UE. Furthermore, a same aggregation level may be applied for the transmission of the multiple PDCCHs. This means that the number of symbols used for the transmission of different PDCCHs for the UE can be same.

In some alternative embodiments of the present disclosure, different aggregation levels can be applied for the transmission of different PDCCHs. To allow a same frequency allocation of the different PDCCHs, the aggregation level of one PDCCH may be $2^N$ times the aggregation level of another PDCCH. For instance, the aggregation level of 2 may be applied for a first PDCCH, while the aggregation level of 4 may be applied for a second PDCCH.

According to some embodiments of the present disclosure, the linkage between the aggregation levels for the multiple PDCCHs may be configured by higher layers via NR remaining minimum system information (RMSI), NR other system information (OSI) or dedicated radio resource control (RRC) signaling, which can help in reducing the number of blind decoding attempts for the UE.

FIG. 1 shows example configurations of a CORESET of multiplexing multiple PDCCHs in a TDM manner with a same frequency resource according to some embodiments of the present disclosure.

In the first example shown by the left figure, the same frequency resource is allocated for the transmission of the shared DMRS, the first PDCCH carrying the DL DCI and the second PDCCH carrying the UL DCI. Further, one symbol is used for the transmission of the first PDCCH and the second PDCCH, respectively. In the second example shown by the right figure, the same frequency resource is allocated for the transmission of the shared DMRS, the first PDCCH carrying the DL DCI and the second PDCCH carrying the UL DCI. Further, one symbol is used for the transmission of the first PDCCH carrying the DL DCI, while two symbols are used for the transmission of the second PDCCH carrying the UL DCI, respectively. This indicate that the aggregation level of the second PDCCH carrying the UL DCI is twice the aggregation level of the first PDCCH carrying the DL DCI.

In some embodiments of the present disclosure, the frequency resources allocated to multiple PDCCHs may be different. In an example, a frequency resource for a first PDCCH may include a frequency resource of a second PDCCH, and the frequency resource for DMRS may be same as or larger than the frequency resource for the first PDCCH. Alternatively, the frequency resource for the first PDCCH may partially overlap with the frequency resource for the second PDCCH or may not overlap with the frequency resource for the second PDCCH. In this case, the frequency resource for the DMRS may be same as or larger than a union of the frequency resources of the first and second PDCCHs. Also, a wideband DMRS may be used, where the DMRS may span all the frequency resource in the CORESET.

Figure 2:
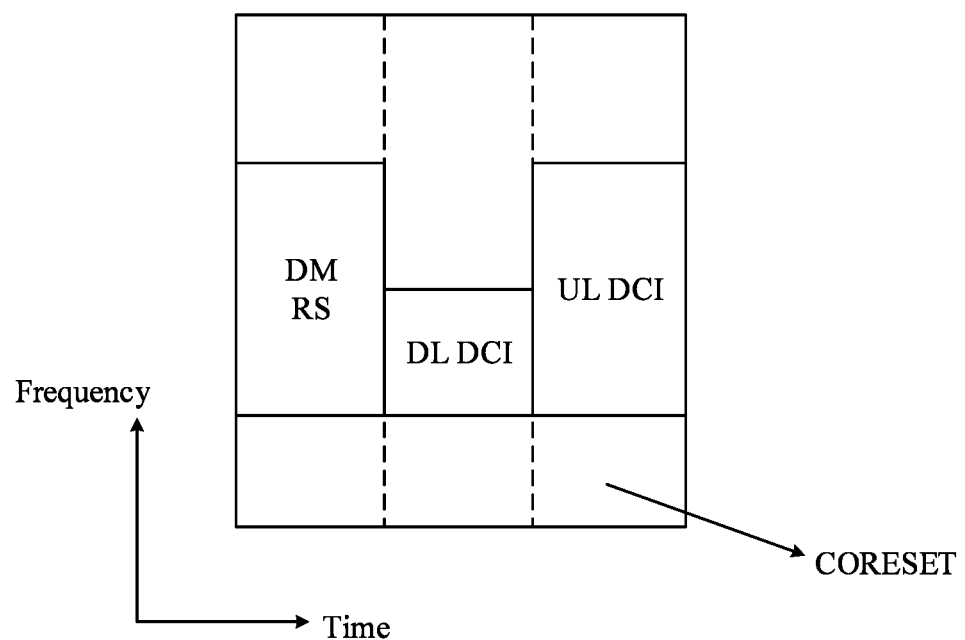
FIG. 2 shows an example configuration of a CORESET of multiplexing multiple PDCCHs in a TDM manner with different frequency resources according to some embodiments of the present disclosure.

FIG. 2 shows an example configuration of a CORESET of multiplexing multiple PDCCHs in a TDM manner with different frequency resources according to some embodiments of the present disclosure. In the example, the aggregation level of the PDCCH carrying the DL DCI is half of the aggregation level of the PDCCH carrying the UL DCI. As shown in FIG. 2, the frequency resource for the PDCCH carrying the UL DCI includes the frequency resource for the PDCCH carrying the DL DCI and is actually twice the frequency resource for the PDCCH carrying the DL DCI. Further, the frequency resource for the DMRS is same as the frequency resource for the PDCCH carrying the UL DCI.

Figure 3:
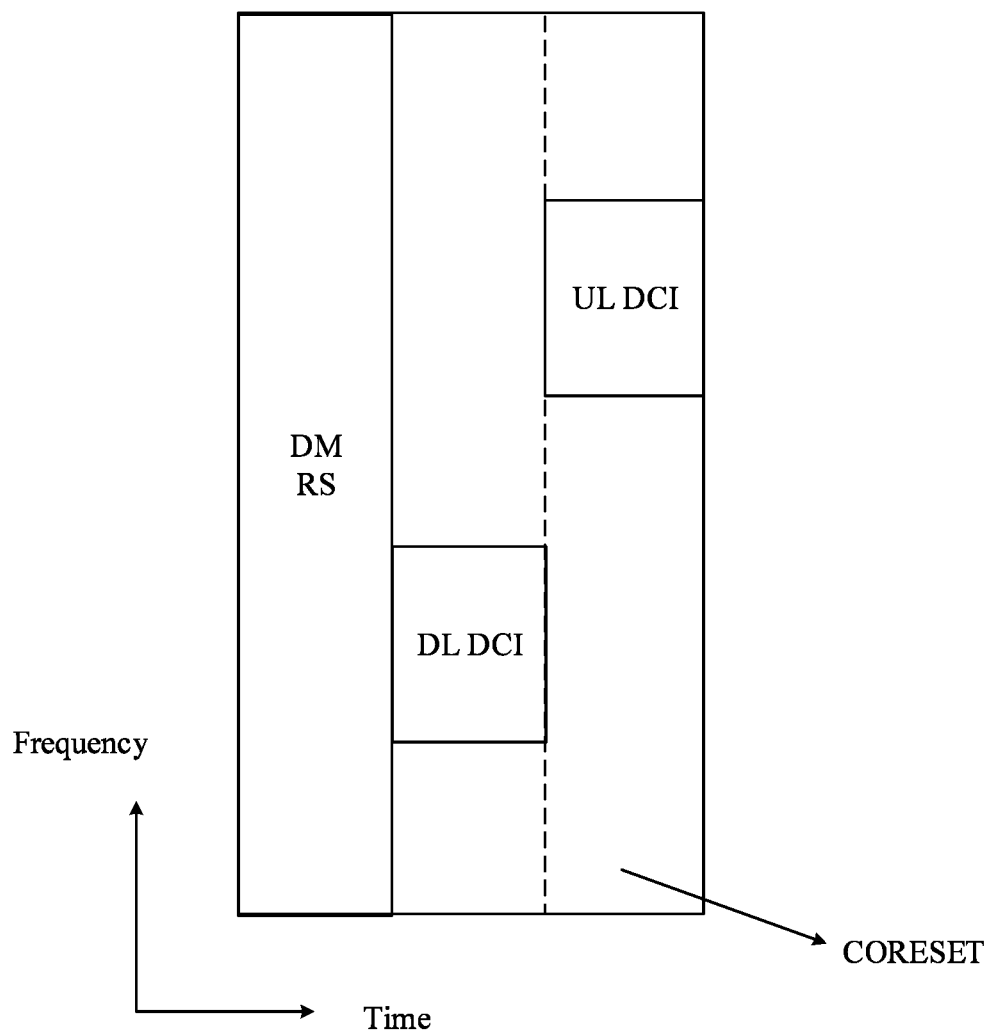
FIG. 3 shows another example configuration of a CORESET of multiplexing multiple PDCCHs in a TDM manner with different frequency resources according to some embodiments of the present disclosure.

FIG. 3 shows another example configuration of a CORESET of multiplexing multiple PDCCHs in a TDM manner with different frequency resources according to some embodiments of the present disclosure. In the example, the PDCCH carrying the DL DCI and the PDCCH carrying the UL DCI are transmitted in disjointed frequency resources in the CORESET. Further, a wideband DMRS is used where the DMRS spans all the frequency resource in the CORESET.

According to some embodiments of the present disclosure, one or more DL and/or UL DCIs carried in one or more PDCCHs may be appended with a Cyclic Redundancy Errors (CRC) code. The CRC appended one or more DCIs may be concatenated and a joint channel coding may be performed on the concatenated DCIs. Then the concatenated and coded DCIs may be rate matched to the frequency and time resources in the CORESET allocated for the DCIs. After modulation and other processing, a same Discrete Fourier Transform (DFT) may be performed for the concatenated and coded DCIs. After the DFT operation, resource mapping may be performed to map the one or more PDCCHs into corresponding frequency and time resources in the CORESET.

For example, the frequency resource allocated for the DCIs may include all the frequency resource in the CORESET, and the time resource allocated for the DCIs may be one or more DFT-s-OFDM symbols. Alternatively, the frequency resource of the CORESET may be divided into multiple parts, the coded DL and/or UL DCIs may be only rate matched assuming a part of the frequency resource. Different parts of the frequency resource may be used by different DL and/or UL DCIs. The time resource may also be one or multiple DFT-s-OFDM symbols.

Figure 4:
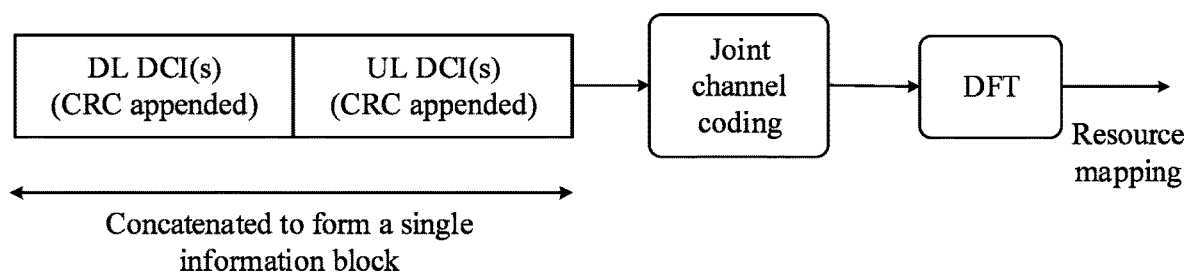
FIG. 4 shows an example procedure of multiplexing multiple DCIs and joint channel coding prior to a Discrete Fourier Transform (DFT) operation according to some embodiments of the present disclosure.

FIG. 4 shows an example procedure of multiplexing multiple DCIs and joint coding prior to a DFT operation according to some embodiments of the present disclosure. As shown in FIG. 4, each DL DCI or UL DCI is firstly appended with a CRC code respectively. Then, the DL DCI(s) and the UL DCI(s) are concatenated and jointly channel coded. After rate matching, modulation and other processing, a same DFT is applied for the DL DCI(s) and the UL DCI(s). After the DFT operation, resource mapping is performed to map the PDCCHs into corresponding resources.

From the point of view of the UE, the UE may perform at least IDFT, rate matching and channel decoding to obtain the concatenated bits of the DL and/or UL DCIs. Then, the UE can perform a CRC checking operation with an assumption of PDCCH aggregation level(s). The CRC checking operation may also include the checking of a masked UE-ID. A DCI is valid if it passes the checking of CRC and UE-ID if applicable.

As described above, one or more PDCCHs carrying one or more DL and/or UL DCIs for a given UE or multiple UEs may be multiplexed in a TDM manner prior to a same DFT operation. In this case, after the DFT operation and resource mapping, the one or more PDCCHs are transmitted in one or more same DFT-s-OFDM symbols.

In an example, the DFT size for the DFT operation may be configured by higher layers via RMSI (SIB1), OSI or RRC signaling. In this case, a linkage between the aggregation levels for the transmission of different PDCCHs may be configured by higher layers via RRC signaling, e.g., as a part of the search space configuration.

Alternatively, the DFT size may be determined in accordance with the aggregation levels for the transmission of different PDCCHs or the CORESET size in frequency. In this case, a union of the aggregation levels for different PDCCHs may be used as the DFT size. For instance, if the aggregation level 2 is used for the transmission of the first PDCCH and the second PDCCH, respectively, then the DFT size may be the aggregation level 4 when one symbol is used for the transmission of the two PDCCHs. When two symbols are used for the transmission of the two PDCCHs, the DFT size may be the aggregation level 2.

Figure 5:
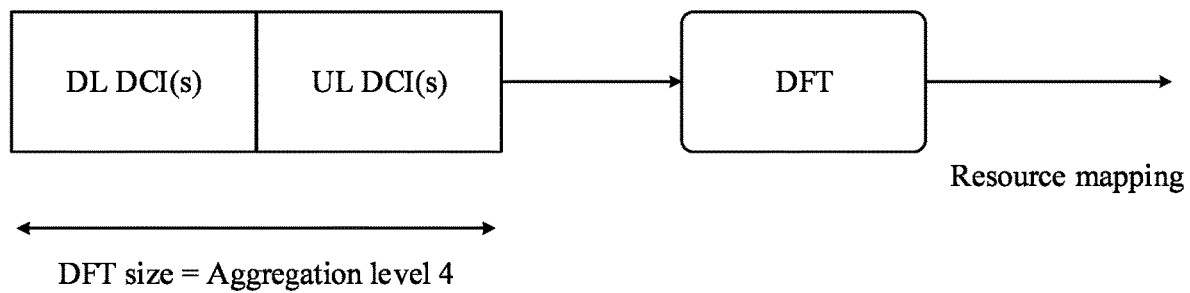
FIG. 5 shows an example procedure of multiplexing multiple DCIs in a TDM manner prior to a DFT operation according to some embodiments of the present disclosure.

FIG. 5 shows an example procedure of multiplexing multiple DCIs in a TDM manner prior to a DFT operation according to some embodiments of the present disclosure. In the example, the same aggregation level of 2 is applied for the transmission of two PDCCHs carrying DL and UL DCIs, respectively. Further, the DFT size of the aggregation level 4 is applied for the DFT operation on the two PDCCHs when the two PDCCHs span 1 symbol. After the DFT operation, resource mapping is performed to map the two PDCCHs into corresponding resources in the CORESET. In addition, similar to the above embodiments, the frequency resource for the DMRS may be same as or larger than the frequency resources of the two PDCCHs. For instance, a wideband DMRS may be applied, where the DMRS may span the CORESET in frequency.

Figure 6:
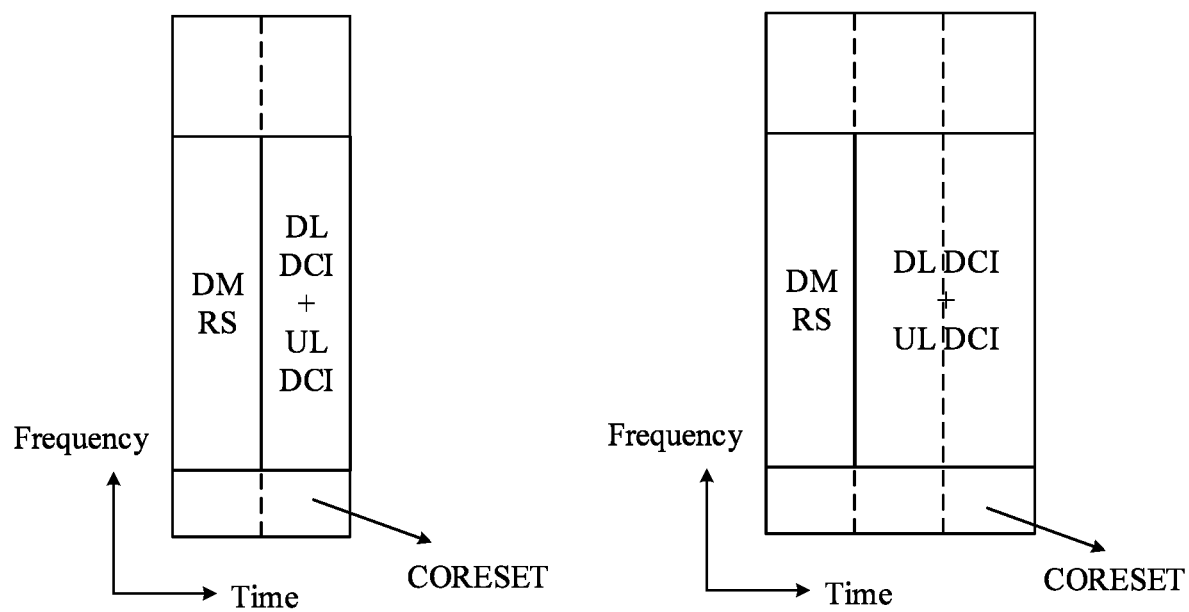
FIG. 6 shows example configurations of a CORESET of multiplexing multiple DCIs in a TDM manner prior to a DFT operation according to some embodiments of the present disclosure.

FIG. 6 shows example configurations of a CORESET of multiplexing multiple DCIs in a TDM manner prior to a DFT operation according to some embodiments of the present disclosure. In the examples as shown by FIG. 6, after the DFT operation and resource mapping, the two PDCCHs span one symbol (left figure) or two symbols (right figure) depending on the CORESET size in time domain. It is noted that the two PDCCHs carrying the DL DCI and the UL DCI are transmitted in the same symbol in the CORESET. Further, the frequency resource for the DMRS is the same as that for the two PDCCHs after the DFT operation.

According to some embodiments of the present disclosure, a joint DCI may be used to indicate one or more DL and/or UL grants. The joint DCI may be carried by a PDCCH in a CORESET for a given UE. Further, the one or more DL and/or UL grants may be jointly included in the joint DCI. In this case, a single CRC code may be appended after the joint DCI. The number of DL and/or UL grants in the same DCI may be predefined in the technical specifications or configured by higher layers via RMSI (SIB1), OSI or RRC signaling or a combination thereof.

In the embodiments, the UE may be configured to monitor multiple joint DCIs in the CORESET in a slot. Different combinations of DL and/or UL grants may be configured by RRC signaling. In an example, the total number of DL and/or UL grants in the joint DCI may be predefined as 2, so the joint DCI may include one DL and one UL grant or two DL grants or two UL grants. In order to allow UE to identify whether the joint DCI is for DL and/or UL grant, a field of Identifier for DCI formats may be included in both DL and UL grants to indicate a DCI format of the joint DCI. The DCI format may include a new DCI format for indicating a type of the DL and/or UL grants and a number of the DL or UL grants. The field may be included at the beginning of DL and/or UL grant similar to NR Rel-15 design.

Furthermore, the field of Identifier for DCI formats may be extended to support more than one combination of DCI formats. For instance, the UE may perform blind decoding on DL grant only, UL grant only, both DL grant and UL grant, and two DL grants. In case when the sizes of different combinations of DCI formats are different, zero padding may be used to match the size of the largest combination of DCI formats.

In an example, assuming a new DCI format indicating both DL and UL grants as the DCI format A, and a new DCI format indicating two DL grants as the DCI format B, respectively, the field of Identifier for DCI formats may be extended as illustrated in Table 1.

TABLE 1

Identifier for DCI formats

| Identifier for DCI formats | DCI format |
|---|---|
| 00 | DCI format 0_0 |
| 01 | DCI format 1_0 |
| 10 | DCI format A |
| 11 | DCI format B |

It is noted that the joint DCIs of the two new DCI formats may be concatenated based on the fallback DCIs, i.e., DCIs of DCI formats 0_0 and 1_0. Further, the DCI formats as illustrated in the Table 1 may be easily extended to support non-fallback DCIs, i.e., DCIs of DCI formats 0_1/0_2 and 1_1/1_2. In other words, the joint DCI may include either fallback DCIs (DCI format 0_0 and/or 1_0) or non-fallback DCIs (DCI format 0_1 and 1_1) for all DL and/or UL grant. In an example, in case when one DL grant and one UL grant are included in the joint DCI, DCI formats 1_0 and 0_0 are applied, respectively. In another example, when one DL grant and one UL grant are included in the joint DCI, DCI formats 1_1 and/or 1_2 and 0_1 and/or 0_2 are applied, respectively. In addition, when one or more DL and UL grants are included in the joint DCI, the positions of the DL grant and the UL grant may be predefined in the technical specifications. For instance, the DL grant may be placed prior to the UL grant in the joint DCI.

Figure 7:
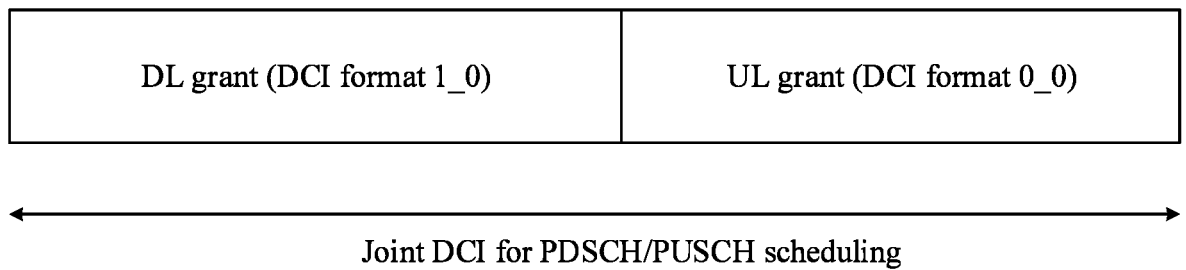
FIG. 7 shows an example joint DCI for scheduling of DL and UL transmissions according to some embodiments of the present disclosure.

FIG. 7 shows an example joint DCI for scheduling of DL and UL transmissions according to some embodiments of the present disclosure. In the example, the DL grant with the DCI format 1_0 is placed before the UL grant with the DCI format 0_0 in the joint DCI.

In some embodiments of the present disclosure, in order to reduce the number of blind decoding attempts of the UE and hence save power consumption of the UE, the size of the joint DCI may be aligned with that of DCIs of other DCI formats including group common DCIs. For instance, the joint DCI may be size matched with the DCI of the DCI format 2_0 and/or 2_1.

In some embodiments of the present disclosure, in order to further reduce the size of the joint DCI, some fields in the one or more DL and/or UL grants may be shared. In other words, one or more common fields may be used to jointly indicate the scheduling of one or more DL and/or UL transmissions. For example, the common fields may be placed at the beginning of the joint DCI.

In an example, a common field for time domain resource allocation (TDRA) and/or frequency domain resource allocation (FDRA) may be used to indicate the resource allocation in time and/or frequency domain in the one or more DL and/or UL grants in the joint DCI, respectively. In another example, a common field of modulation and coding scheme (MCS) may be included for the one or more DL and/or UL grants, which may be commonly applied for Physical Downlink Shared Channel (PDSCH) and Physical Uplink Shared Channel (PUSCH) transmission in the joint DCI.

Figure 8:
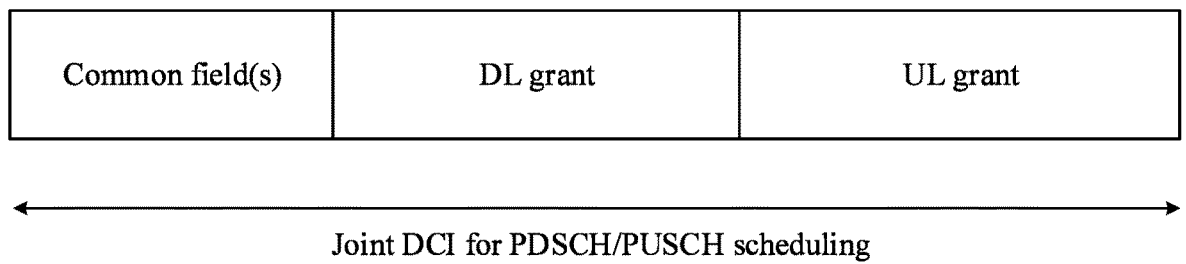
FIG. 8 shows an example joint DCI for scheduling of DL and UL transmissions according to some embodiments of the present disclosure.

FIG. 8 shows another example joint DCI for scheduling of DL and UL transmissions according to some embodiments of the present disclosure. In the example, the joint DCI includes common fields, the DL grant and the UL grant, and the common fields are placed at the beginning of the joint DCI and followed by the DL grant and the UL grant.

According to some embodiments of the present disclosure, the common fields may include an identifier for the joint DCI to differentiate whether the joint DCI may include one DL grant, one UL grant, a combination of DL and UL grant, or two DL grants. In other words, the identifier for the joint DCI may indicate a type of the DL or UL grants and a number of the DL or UL grants. Table 2 illustrates an example of the identifier for the joint DCI.

TABLE 2

Identifier for joint DCI

| Identifier for joint DCI | Indication |
|---|---|
| 00 | One DL grant |
| 01 | One UL grant |
| 10 | One DL grant and one UL grant |
| 11 | Two DL grants |

In the embodiments, when only one DL grant or one UL grant is included in the joint DCI, zero padding may be used for size matching of the joint DCI. More specifically, when only DL grant is included in the joint DCI, one or more zeros may be inserted in the position of UL grant. Similar operations may be applied for the case when only UL grant is included in the joint DCI. Also, it is noted that when different DCI formats are defined for DL and UL grants, separate zero padding may be applied for the DL grant and/or the UL grant in the joint DCI. In this case, the DL grant and the UL grant may be size matched with one of the DCI formats in the DL and UL grants, respectively.

In addition, the common fields may include a bandwidth part indicator, a carrier indicator, and a transmission configuration indication (TCI). In this case, when both DL and UL grants are included in the joint DCI, the common fields may indicate that both DL and UL transmissions are scheduled in a same carrier, bandwidth part or using a same TCI state.

In the foregoing embodiments, the mechanisms for transmission of multiple PDCCHs with the DFT-s-OFDM waveform in the TDM manner have been described in details. It is clear that the multiple DCIs may be multiplexed in the TDM manner and transmitted between an Access Node (AN) (e.g. a base station (BS), an evolved NodeB (eNB), and a next generation NodeB (gNB)) and a User Equipment (UE), so the operations associated with the transmission of the multiple PDCCHs in the TDM manner at the AN and the UE will be described below respectively with reference to FIG. 9 and FIG. 10.

Figure 9:
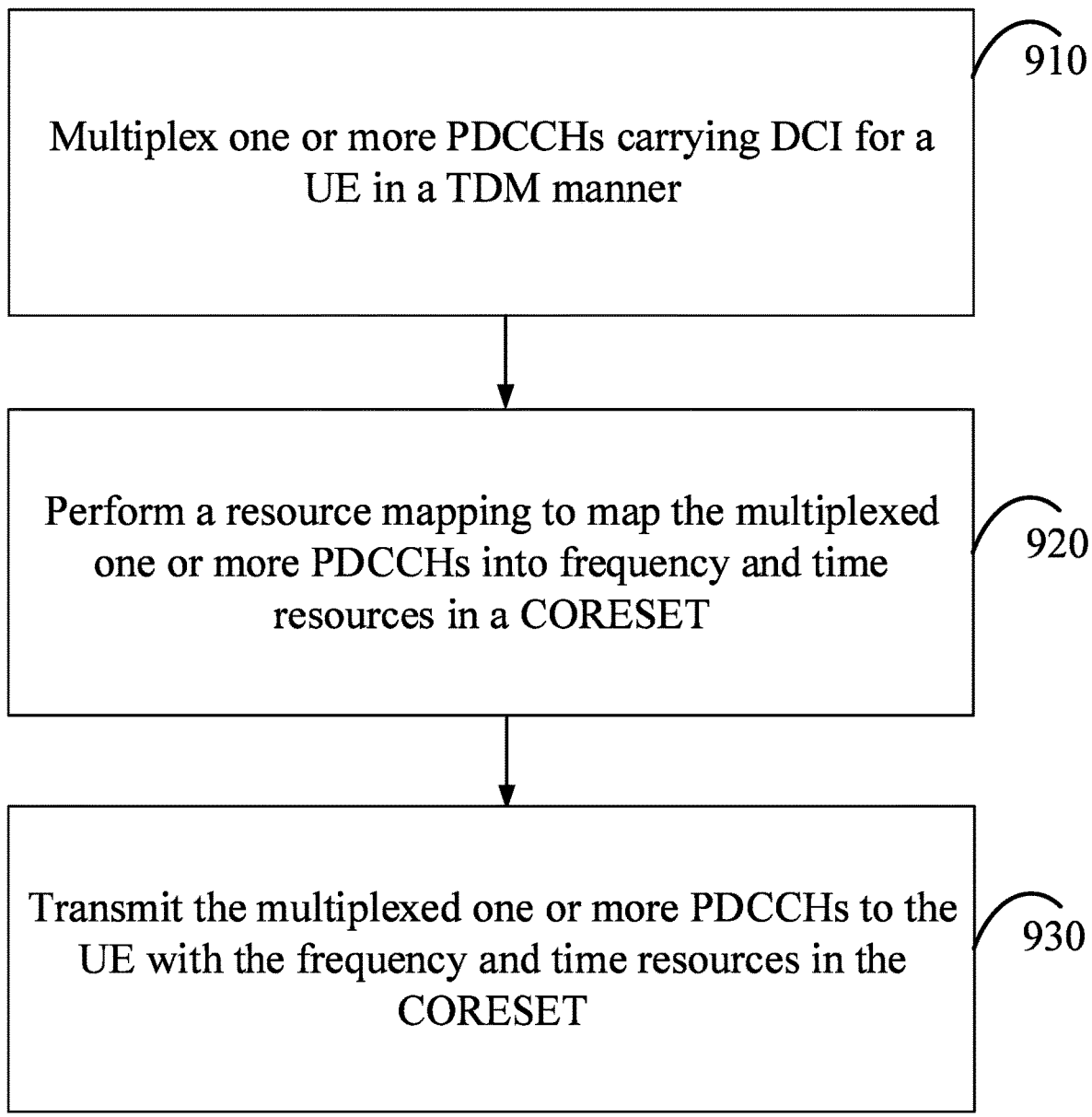
FIG. 9 shows an example procedure to be performed at an Access Node (AN) according to some embodiments of the present disclosure.

FIG. 9 shows an example procedure 900 to be performed at an AN according to some embodiments of the present disclosure. The example procedure 900 may include operations 910 to 930.

At operation 910, the AN may multiplex one or more PDCCHs carrying DCI for a UE in a TDM manner.

At operation 920, the AN may perform a resource mapping to map the multiplexed one or more PDCCHs into frequency and time resources in a CORESET.

At operation 930, the AN may transmit the multiplexed one or more PDCCHs to the UE with the frequency and time resources in the CORESET.

In some embodiments, the one or more PDCCHs may be respectively transmitted in one or more different DFT-s-OFDM symbols in the CORESET.

In some embodiments, the procedure 900 may further include encoding a shared DMRS for the one or more PDCCHs; and transmitting the shared DMRS to the UE with the frequency and time resources in the CORESET.

Regarding allocation of the frequency resource for the shared DMRS, there may be various options in different embodiments. For example, the frequency resource allocated to the shared DMRS may be same as the frequency resource allocated to each of the one or more PDCCHs; the frequency resource allocated to the shared DMRS may span all the frequency resource in the CORESET; the frequency resource allocated to the shared DMRS may include frequency resources allocated to the one or more PDCCHs; the frequency resource allocated to the shared DMRS may be same as or larger than a union of frequency resources allocated to the one or more PDCCHs; the frequency resource allocated to the shared DMRS may be same as or proportional to a frequency resource allocated to a PDCCH with a largest aggregation level among the one or more PDCCHs.

Likewise, regarding allocation of the frequency resource for the one or more PDCCHs, there may be also various options in different embodiments. For example, a first frequency resource allocated to a first PDCCH of the one or more PDCCHs may fully or partially overlap with a second frequency resource allocated to a second PDCCH of the one or more PDCCHs; a first frequency resource allocated to a first PDCCH of the one or more PDCCHs may not overlap with a second frequency resource allocated to a second PDCCH of the one or more PDCCHs; a first frequency resource allocated to a first PDCCH of the one or more PDCCHs may include a second frequency resource allocated to a second PDCCH of the one or more PDCCHs.

In some embodiments, a same aggregation level may be applied for the one or more PDCCHs. In some alternative embodiments, a first aggregation level for a first PDCCH of the one or more PDCCHs may be $2^N$ times a second aggregation level for a second PDCCH of the one or more PDCCHs. The linkage between aggregation levels for the one or more PDCCHs may be configured by higher layers via RMSI, OSI or dedicated RRC signaling.

In some embodiments, the operation 910 of multiplexing the one or more PDCCHs may include appending a CRC code to one or more DCIs respectively carried in the one or more PDCCHs; concatenating the CRC appended one or more DCIs and perform a joint channel coding on the concatenated DCIs; and performing a same DFT operation for the concatenated and coded DCIs after rate matching and modulation to provide the multiplexed one or more PDCCHs. In this case, the one or more PDCCHs may be transmitted in one or more same DFT-s-OFDM symbols in the CORESET. The DFT size for the DFT operation may be configured by higher layers via RMSI, OSI or dedicated RRC signaling. Alternatively, the DFT size for the DFT operation may be determined in accordance with aggregation levels for the one or more PDCCHs.

In some embodiments, the DCI may include a joint DCI containing one or more DL or UL grants. The number of the one or more DL or UL grants in the joint DCI may be configured by higher layers via RMSI, OSI or RRC signaling. Further, the DCI may include a field of Identifier for DCI formats to indicate a DCI format of the DCI, and the DCI format may include a new DCI format for indicating a type of the one or more DL or UL grants and a number of the one or more DL or UL grants. The joint DCI may be concatenated based on one or more fallback DCIs or based on one or more non-fallback DCIs. The size of the joint DCI may be matched with a size of a DCI of a common DCI format by zero padding.

In some embodiments, the joint DCI may include a common field for the one or more DL or UL grants that may be used to jointly indicate scheduling of one or more DL or UL transmissions. The common field may include an identifier for the joint DCI to indicate a type of the one or more DL or UL grants and a number of the one or more DL or UL grants.

FIG. 10 shows an example procedure 1000 to be performed at a UE according to some embodiments of the present disclosure. The example procedure 1000 may include operations 1010 to 1020.

At operation 1010, the UE may decode one or more PDCCHs received from an AN. The one or more PDCCHs are multiplexed in a TDM manner and transmitted with frequency and time resources in a CORESET.

At operation 1020, the UE may identify one or more DCIs carried in the one or more PDCCHs.

In some embodiments, the one or more PDCCHs may be respectively transmitted in one or more different DFT-s-OFDM symbols in the CORESET.

In some embodiments, the procedure 1000 may further include decoding a shared DMRS for the one or more PDCCHs received from the AN; and decoding the one or more PDCCHs based on the shared DMRS.

Regarding allocation of the frequency resource for the shared DMRS, there may be various options in different embodiments. For example, the frequency resource allocated to the shared DMRS may be same as the frequency resource allocated to each of the one or more PDCCHs; the frequency resource allocated to the shared DMRS may span all the frequency resource in the CORESET; the frequency resource allocated to the shared DMRS may include frequency resources allocated to the one or more PDCCHs; the frequency resource allocated to the shared DMRS may be same as or larger than a union of frequency resources allocated to the one or more PDCCHs; the frequency resource allocated to the shared DMRS may be same as or proportional to a frequency resource allocated to a PDCCH with a largest aggregation level among the one or more PDCCHs.

Likewise, regarding allocation of the frequency resource for the one or more PDCCHs, there may be also various options in different embodiments. For example, a first frequency resource allocated to a first PDCCH of the one or more PDCCHs may fully or partially overlap with a second frequency resource allocated to a second PDCCH of the one or more PDCCHs; a first frequency resource allocated to a first PDCCH of the one or more PDCCHs may not overlap with a second frequency resource allocated to a second PDCCH of the one or more PDCCHs; a first frequency resource allocated to a first PDCCH of the one or more PDCCHs may include a second frequency resource allocated to a second PDCCH of the one or more PDCCHs.

In some embodiments, a same aggregation level may be applied for the one or more PDCCHs. In some alternative embodiments, a first aggregation level for a first PDCCH of the one or more PDCCHs may be $2^N$ times a second aggregation level for a second PDCCH of the one or more PDCCHs. The linkage between aggregation levels for the one or more PDCCHs may be configured by higher layers via RMSI, OSI or dedicated RRC signaling.

In some embodiments, the one or more PDCCHs may carry one or more DCIs that are appended with a Cyclic Redundancy Check (CRC) code and concatenated, and the one or more PDCCHs may be transmitted in one or more same Discrete Fourier Transform-spread-OFDM (DFT-s-OFDM) symbols in the CORESET. In this case, the operation 1010 of decoding the one or more PDCCHs may include performing a same Inverse Discrete Fourier Transform (IDFT) operation for the one or more PDCCHs, and the operation 1020 of identifying the one or more DCIs may include performing a CRC checking operation with an assumption of aggregation levels for the one or more PDCCHs.

In some embodiments, the DCI may include a joint DCI containing one or more DL or UL grants. The number of the one or more DL or UL grants in the joint DCI may be configured by higher layers via RMSI, OSI or RRC signaling. Further, the DCI may include a field of Identifier for DCI formats to indicate a DCI format of the DCI, and the DCI format may include a new DCI format for indicating a type of the one or more DL or UL grants and a number of the one or more DL or UL grants. The joint DCI may be concatenated based on one or more fallback DCIs or based on one or more non-fallback DCIs. The size of the joint DCI may be matched with a size of a DCI of a common DCI format by zero padding.

In some embodiments, the joint DCI may include a common field for the one or more DL or UL grants that may be used to jointly indicate scheduling of one or more DL or UL transmissions. The common field may include an identifier for the joint DCI to indicate a type of the one or more DL or UL grants and a number of the one or more DL or UL grants.

Figure 11:
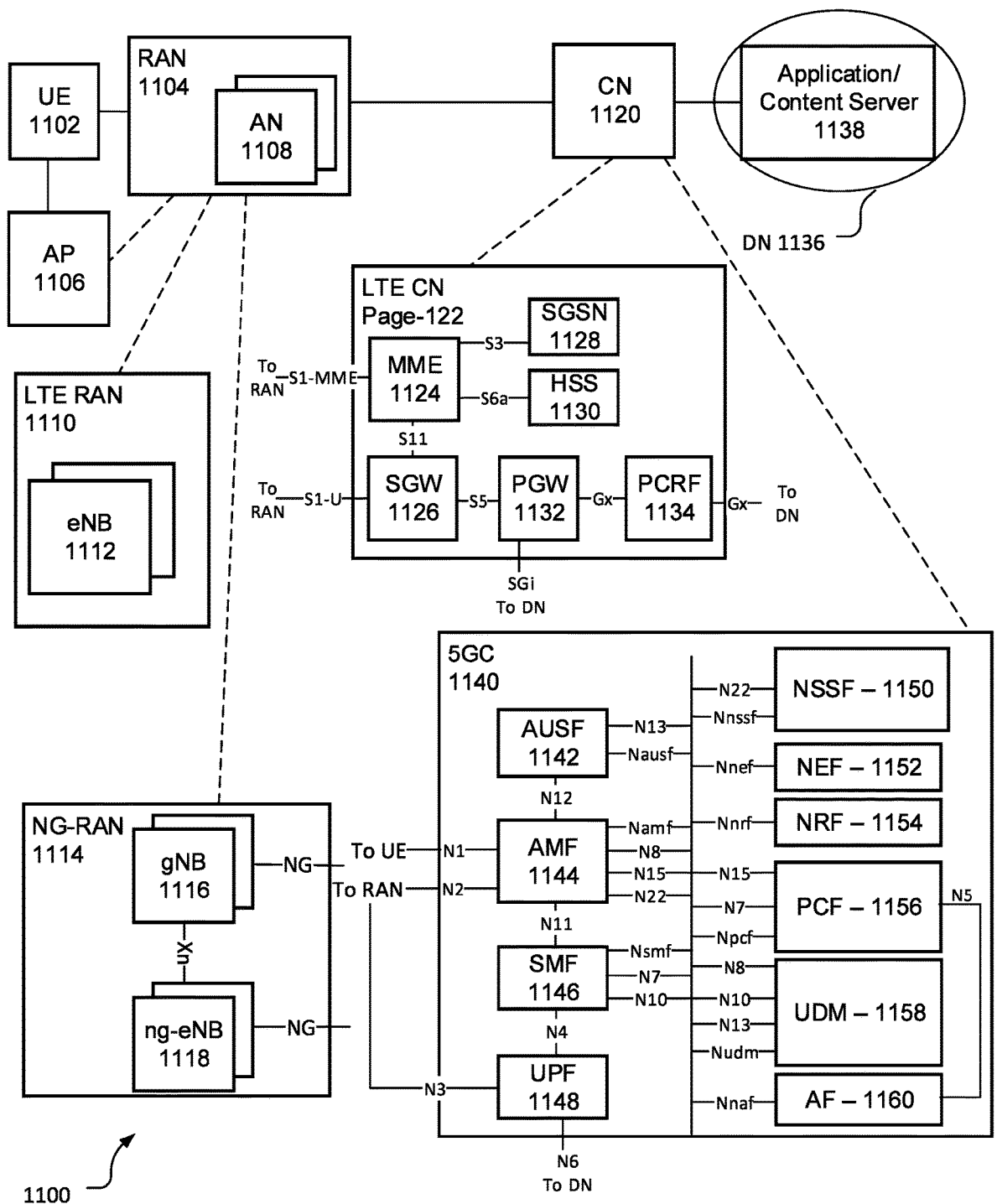
FIG. 11 illustrate an example network according to some embodiments of the present disclosure.
Figure 12:
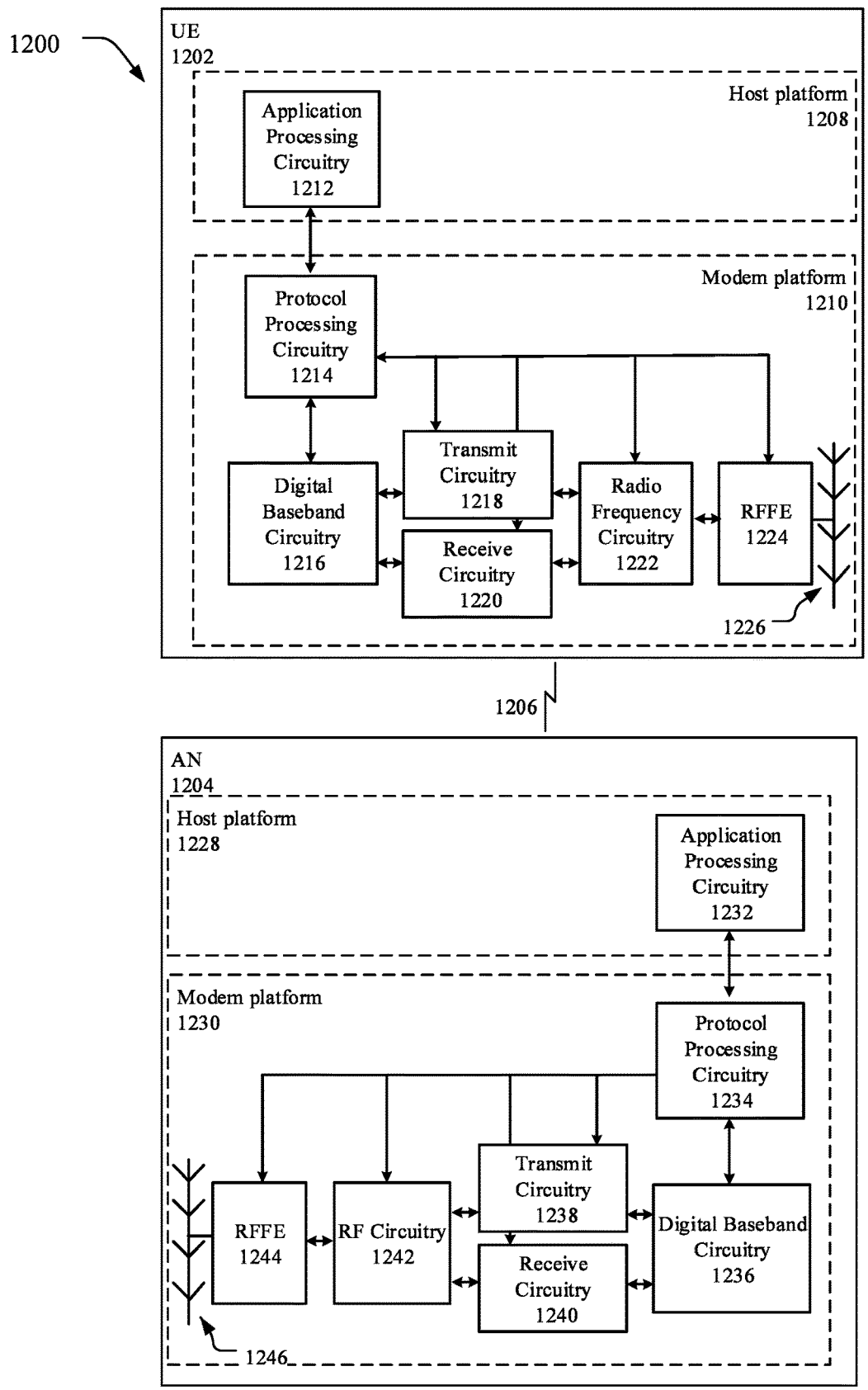
FIG. 12 schematically illustrates a wireless network according to some embodiments of the present disclosure.

FIG. 11 and FIG. 12 illustrate various systems, devices, and components that may implement aspects of disclosed embodiments.

FIG. 11 illustrates a network 1100 in accordance with various embodiments. The network 1100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1100 may include a UE 1102, which may include any mobile or non-mobile computing device designed to communicate with a Radio Access Network (RAN) 1104 via an over-the-air connection. The UE 1102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, Machine-to-Machine (M2M) or Device-to-Device (D2D) device, Internet of Things (IoT) device, etc.

In some embodiments, the network 1100 may include a plurality of UEs coupled directly with one another via a sidelink interface. The UEs may be M2M/D2D devices that communicate using physical sidelink channels such as, but not limited to, Physical Sidelink Broadcast Channel (PSBCH), Physical Sidelink Downlink Channel (PSDCH), Physical Sidelink Shared Channel (PSSCH), Physical Sidelink Control Channel (PSCCH), Physical Sidelink Feedback Channel (PSFCH), etc.

In some embodiments, the UE 1102 may additionally communicate with an Access Point (AP) 1106 via an over-the-air connection. The AP 1106 may manage a Wireless Local Area Network (WLAN) connection, which may serve to offload some/all network traffic from the RAN 1104. The connection between the UE 1102 and the AP 1106 may be consistent with any IEEE 802.11 protocol, wherein the AP 1106 could be a wireless fidelity (Wi-Fi®) router. In some embodiments, the UE 1102, RAN 1104, and AP 1106 may utilize cellular-WLAN aggregation (for example, LTE-WLAN aggregation (LWA)/LTE-WLAN Radio Level Integration with IPsec Tunnel (LWIP)). Cellular-WLAN aggregation may involve the UE 1102 being configured by the RAN 1104 to utilize both cellular radio resources and WLAN resources.

The RAN 1104 may include one or more access nodes, for example, AN 1108. AN 1108 may terminate air-interface protocols for the UE 1102 by providing access stratum protocols including Radio Resource Control (RRC), Packet Data Convergence (PDCP), Radio Link Control (RLC), Medium Access Control (MAC), and L1 protocols. In this manner, the AN 1108 may enable data/voice connectivity between Core Network (CN) 1120 and the UE 1102. In some embodiments, the AN 1108 may be implemented in a discrete device or as one or more software entities running on server computers as part of, for example, a virtual network, which may be referred to as a Cloud RAN (CRAN) or virtual baseband unit pool. The AN 1108 be referred to as a BS, gNB, RAN node, eNB, ng-eNB, NodeB, Road Side Unit (RSU), Transmission Reception Point (TRxP, TRP), etc. The AN 1108 may be a macrocell base station or a low power base station for providing femtocells, picocells or other like cells having smaller coverage areas, smaller user capacity, or higher bandwidth compared to macrocells.

In embodiments in which the RAN 1104 includes a plurality of ANs, they may be coupled with one another via an X2 interface (if the RAN 1104 is an LTE RAN) or an Xn interface (if the RAN 1104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1104 may each manage one or more cells, cell groups, component carriers, etc. to provide the UE 1102 with an air interface for network access. The UE 1102 may be simultaneously connected with a plurality of cells provided by the same or different ANs of the RAN 1104. For example, the UE 1102 and RAN 1104 may use carrier aggregation to allow the UE 1102 to connect with a plurality of component carriers, each corresponding to a Pcell or Scell. In dual connectivity scenarios, a first AN may be a master node that provides an Master Cell Group (MCG) and a second AN may be secondary node that provides an Secondary Cell Group (SCG). The first/second ANs may be any combination of eNB, gNB, ng-eNB, etc.

The RAN 1104 may provide the air interface over a licensed spectrum or an unlicensed spectrum. To operate in the unlicensed spectrum, the nodes may use Licensed Assisted Access (LAA), enhanced LAA (eLAA), and/or further enhanced LAA (feLAA) mechanisms based on Carrier Aggregation (CA) technology with PCells/Scells. Prior to accessing the unlicensed spectrum, the nodes may perform medium/carrier-sensing operations based on, for example, a listen-before-talk (LBT) protocol.

In Vehicle-to-everything (V2X) scenarios the UE 1102 or AN 1108 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1104 may be an LTE RAN 1110 with eNBs, for example, eNB 1112. The LTE RAN 1110 may provide an LTE air interface with the following characteristics: Subcarrier Spacing (SCS) of 15 kHz; CP-OFDM waveform for DL and Single Carrier Frequency Division Multiple Access (SC-FDMA) waveform for UL; turbo codes for data and TBCC for control; etc. The LTE air interface may rely on Channel-State Information Reference Signal (CSI-RS) for CSI acquisition and beam management; PDSCH/PDCCH DMRS for PDSCH/PDCCH demodulation; and Cell Reference Signal (CRS) for cell search and initial acquisition, channel quality measurements, and channel estimation for coherent demodulation/detection at the UE. The LTE air interface may operating on sub-6 GHz bands.

In some embodiments, the RAN 1104 may be an NG-RAN 1114 with gNBs, for example, gNB 1116, or ng-eNBs, for example, ng-eNB 1118. The gNB 1116 may connect with 5G-enabled UEs using a 5G NR interface. The gNB 1116 may connect with a 5G core through an NG interface, which may include an N2 interface or an N3 interface. The ng-eNB 1118 may also connect with the 5G core through an NG interface, but may connect with a UE via an LTE air interface. The gNB 1116 and the ng-eNB 1118 may connect with each other over an Xn interface.

In some embodiments, the NG interface may be split into two parts, an NG user plane (NG-U) interface, which carries traffic data between the nodes of the NG-RAN 1114 and a UPF 1148 (e.g., N3 interface), and an NG control plane (NG-C) interface, which is a signaling interface between the nodes of the NG-RAN 1114 and an Access and Mobility Management Function (AMF) 1144 (e.g., N2 interface).

The NG-RAN 1114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase-tracking reference signal (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include a Synchronization Signal Block (SSB) that is an area of a downlink resource grid that includes Primary Synchronization Signal (PSS)/Secondary Synchronization Signal (SSS)/PBCH.

In some embodiments, the 5G-NR air interface may utilize BWPs for various purposes. For example, BWP can be used for dynamic adaptation of the SCS. For example, the UE 1102 can be configured with multiple BWPs where each BWP configuration has a different SCS. When a BWP change is indicated to the UE 1102, the SCS of the transmission is changed as well. Another use case example of BWP is related to power saving. In particular, multiple BWPs can be configured for the UE 1102 with different amount of frequency resources (for example, PRBs) to support data transmission under different traffic loading scenarios. A BWP containing a smaller number of PRBs can be used for data transmission with small traffic load while allowing power saving at the UE 1102 and in some cases at the gNB 1116. A BWP containing a larger number of PRBs can be used for scenarios with higher traffic load.

The RAN 1104 is communicatively coupled to CN 1120 that includes network elements to provide various functions to support data and telecommunications services to customers/subscribers (for example, users of UE 1102). The components of the CN 1120 may be implemented in one physical node or separate physical nodes. In some embodiments, Network Functions Virtualization (NFV) may be utilized to virtualize any or all of the functions provided by the network elements of the CN 1120 onto physical compute/storage resources in servers, switches, etc. A logical instantiation of the CN 1120 may be referred to as a network slice, and a logical instantiation of a portion of the CN 1120 may be referred to as a network sub-slice.

In some embodiments, the CN 1120 may be an LTE CN 1122, which may also be referred to as an Evolved Packet Core (EPC). The LTE CN 1122 may include Mobility Management Entity (MME) 1124, Serving Gateway (SGW) 1126, Serving GPRS Support Node (SGSN) 1128, Home Subscriber Server (HSS) 1130, PDN Gateway (PGW) 1132, and Policy Control and Charging Rules Function (PCRF) 1134 coupled with one another over interfaces (or "reference points") as shown. Functions of the elements of the LTE CN 1122 may be briefly introduced as follows.

The MME 1124 may implement mobility management functions to track a current location of the UE 1102 to facilitate paging, bearer activation/deactivation, handovers, gateway selection, authentication, etc.

The SGW 1126 may terminate an Si interface toward the RAN and route data packets between the RAN and the LTE CN 1122. The SGW 1126 may be a local mobility anchor point for inter-RAN node handovers and also may provide an anchor for inter-3GPP mobility. Other responsibilities may include lawful intercept, charging, and some policy enforcement.

The SGSN 1128 may track a location of the UE 1102 and perform security functions and access control. In addition, the SGSN 1128 may perform inter-EPC node signaling for mobility between different Radio Access Technology (RAT) networks; Packet Data Network (PDN) and S-GW selection as specified by MME 1124; MME selection for handovers; etc. The S3 reference point between the MME 1124 and the SGSN 1128 may enable user and bearer information exchange for inter-3GPP access network mobility in idle/active states.

The HSS 1130 may include a database for network users, including subscription-related information to support the network entities' handling of communication sessions. The HSS 1130 can provide support for routing/roaming, authentication, authorization, naming/addressing resolution, location dependencies, etc. An S6a reference point between the HSS 1130 and the MME 1124 may enable transfer of subscription and authentication data for authenticating/authorizing user access to the LTE CN 1120.

The PGW 1132 may terminate an SGi interface toward a data network (DN) 1136 that may include an application/content server 1138. The PGW 1132 may route data packets between the LTE CN 1122 and the data network 1136. The PGW 1132 may be coupled with the SGW 1126 by an S5 reference point to facilitate user plane tunneling and tunnel management. The PGW 1132 may further include a node for policy enforcement and charging data collection (for example, Policy and Charging Enforcement Function (PCEF)). Additionally, the SGi reference point between the PGW 1132 and the data network 1136 may be an operator external public, a private PDN, or an intra-operator packet data network, for example, for provision of IP Multimedia Subsystem (IMS) services. The PGW 1132 may be coupled with a PCRF 1134 via a Gx reference point.

The PCRF 1134 is the policy and charging control element of the LTE CN 1122. The PCRF 1134 may be communicatively coupled to the app/content server 1138 to determine appropriate QoS and charging parameters for service flows. The PCRF 1132 may provision associated rules into a PCEF (via Gx reference point) with appropriate Traffic Flow Template (TFT) and Quasi co-location (QCI).

In some embodiments, the CN 1120 may be a 5G CN (5GC) 1140. The 5GC 1140 may include an Authentication Server Function (AUSF) 1142, AMF 1144, Session Management Function (SMF) 1146, User Plane Function (UPF) 1148, Network Slice Selection Function (NSSF) 1150, Network Exposure Function (NEF) 1152, NF Repository Function (NRF) 1154, Policy Control Function (PCF) 1156, Unified Data Management (UDM) 1158, and Application Function (AF) 1160 coupled with one another over interfaces (or "reference points") as shown. Functions of the elements of the 5GC 1140 may be briefly introduced as follows.

The AUSF 1142 may store data for authentication of UE 1102 and handle authentication-related functionality. The AUSF 1142 may facilitate a common authentication framework for various access types. In addition to communicating with other elements of the 5GC 1140 over reference points as shown, the AUSF 1142 may exhibit an Nausf service-based interface.

The AMF 1144 may allow other functions of the 5GC 1140 to communicate with the UE 1102 and the RAN 1104 and to subscribe to notifications about mobility events with respect to the UE 1102. The AMF 1144 may be responsible for registration management (for example, for registering UE 1102), connection management, reachability management, mobility management, lawful interception of AMF-related events, and access authentication and authorization. The AMF 1144 may provide transport for SM messages between the UE 1102 and the SMF 1146, and act as a transparent proxy for routing SM messages. AMF 1144 may also provide transport for SMS messages between UE 1102 and an SMSF. AMF 1144 may interact with the AUSF 1142 and the UE 1102 to perform various security anchor and context management functions. Furthermore, AMF 1144 may be a termination point of a RAN CP interface, which may include or be an N2 reference point between the RAN 1104 and the AMF 1144; and the AMF 1144 may be a termination point of Non-Access Stratum (NAS) (N1) signaling, and perform NAS ciphering and integrity protection. AMF 1144 may also support NAS signaling with the UE 1102 over an N3 Interworking-Function (IWF) interface.

The SMF 1146 may be responsible for SM (for example, session establishment, tunnel management between UPF 1148 and AN 1108); UE IP address allocation and management (including optional authorization); selection and control of UP function; configuring traffic steering at UPF 1148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1144 over N2 to AN 1108; and determining Session and Service Continuity (SSC) mode of a session. SM may refer to management of a Protocol Data Unit (PDU) session, and a PDU session or "session" may refer to a PDU connectivity service that provides or enables the exchange of PDUs between the UE 1102 and the data network 1136.

The UPF 1148 may act as an anchor point for intra-RAT and inter-RAT mobility, an external PDU session point of interconnect to data network 1136, and a branching point to support multi-homed PDU session. The UPF 1148 may also perform packet routing and forwarding, perform packet inspection, enforce the user plane part of policy rules, lawfully intercept packets (User Plane (UP) collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1148 may include an uplink classifier to support routing traffic flows to a data network.

The NSSF 1150 may select a set of network slice instances serving the UE 1102. The NSSF 1150 may also determine allowed Network Slice Selection Assistance Information (NSSAI) and the mapping to the subscribed Single-NSSAIs (S-NSSAIs), if needed. The NSSF 1150 may also determine the AMF set to be used to serve the UE 1102, or a list of candidate AMFs based on a suitable configuration and possibly by querying the NRF 1154. The selection of a set of network slice instances for the UE 1102 may be triggered by the AMF 1144 with which the UE 1102 is registered by interacting with the NSSF 1150, which may lead to a change of AMF. The NSSF 1150 may interact with the AMF 1144 via an N22 reference point; and may communicate with another NSSF in a visited network via an N31 reference point (not shown). Additionally, the NS SF 1150 may exhibit an Nnssf service-based interface.

The NEF 1152 may securely expose services and capabilities provided by 3GPP network functions for third party, internal exposure/re-exposure, AFs (e.g., AF 1160), edge computing or fog computing systems, etc. In such embodiments, the NEF 1152 may authenticate, authorize, or throttle the AFs. NEF 1152 may also translate information exchanged with the AF 1160 and information exchanged with internal network functions. For example, the NEF 1152 may translate between an AF-Service-Identifier and an internal 5GC information. NEF 1152 may also receive information from other NFs based on exposed capabilities of other NFs. This information may be stored at the NEF 1152 as structured data, or at a data storage NF using standardized interfaces. The stored information can then be re-exposed by the NEF 1152 to other NFs and AFs, or used for other purposes such as analytics. Additionally, the NEF 1152 may exhibit an Nnef service-based interface.

The NRF 1154 may support service discovery functions, receive NF discovery requests from NF instances, and provide the information of the discovered NF instances to the NF instances. NRF 1154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1154 may exhibit the Nnrf service-based interface.

The PCF 1156 may provide policy rules to control plane functions to enforce them, and may also support unified policy framework to govern network behavior. The PCF 1156 may also implement a front end to access subscription information relevant for policy decisions in a Unified Data Repository (UDR) of the UDM 1158. In addition to communicating with functions over reference points as shown, the PCF 1156 exhibit an Npcf service-based interface.

The UDM 1158 may handle subscription-related information to support the network entities' handling of communication sessions, and may store subscription data of UE 1102. For example, subscription data may be communicated via an N8 reference point between the UDM 1158 and the AMF 1144. The UDM 1158 may include two parts, an application front end and a UDR. The UDR may store subscription data and policy data for the UDM 1158 and the PCF 1156, and/or structured data for exposure and application data (including PFDs for application detection, application request information for multiple UEs 1102) for the NEF 1152. The Nudr service-based interface may be exhibited by the UDR 221 to allow the UDM 1158, PCF 1156, and NEF 1152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1158 may exhibit the Nudm service-based interface.

The AF 1160 may provide application influence on traffic routing, provide access to NEF, and interact with the policy framework for policy control.

In some embodiments, the 5GC 1140 may enable edge computing by selecting operator/3rd party services to be geographically close to a point that the UE 1102 is attached to the network. This may reduce latency and load on the network. To provide edge-computing implementations, the 5GC 1140 may select a UPF 1148 close to the UE 1102 and execute traffic steering from the UPF 1148 to data network 1136 via the N6 interface. This may be based on the UE subscription data, UE location, and information provided by the AF 1160. In this way, the AF 1160 may influence UPF (re)selection and traffic routing. Based on operator deployment, when AF 1160 is considered to be a trusted entity, the network operator may permit AF 1160 to interact directly with relevant NFs. Additionally, the AF 1160 may exhibit an Naf service-based interface.

The data network 1136 may represent various network operator services, Internet access, or third party services that may be provided by one or more servers including, for example, application/content server 1138.

FIG. 12 schematically illustrates a wireless network 1200 in accordance with various embodiments. The wireless network 1200 may include a UE 1202 in wireless communication with an AN 1204. The UE 1202 and AN 1204 may be similar to, and substantially interchangeable with, like-named components described elsewhere herein.

The UE 1202 may be communicatively coupled with the AN 1204 via connection 1206. The connection 1206 is illustrated as an air interface to enable communicative coupling, and can be consistent with cellular communications protocols such as an LTE protocol or a 5G NR protocol operating at mmWave or sub-6 GHz frequencies.

The UE 1202 may include a host platform 1208 coupled with a modem platform 1210. The host platform 1208 may include application processing circuitry 1212, which may be coupled with protocol processing circuitry 1214 of the modem platform 1210. The application processing circuitry 1212 may run various applications for the UE 1202 that source/sink application data. The application processing circuitry 1212 may further implement one or more layer operations to transmit/receive application data to/from a data network. These layer operations may include transport (for example UDP) and Internet (for example, IP) operations The protocol processing circuitry 1214 may implement one or more of layer operations to facilitate transmission or reception of data over the connection 1206. The layer operations implemented by the protocol processing circuitry 1214 may include, for example, MAC, RLC, PDCP, RRC and NAS operations.

The modem platform 1210 may further include digital baseband circuitry 1216 that may implement one or more layer operations that are "below" layer operations performed by the protocol processing circuitry 1214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1210 may further include transmit circuitry 1218, receive circuitry 1220, RF circuitry 1222, and RF front end (RFFE) 1224, which may include or connect to one or more antenna panels 1226. Briefly, the transmit circuitry 1218 may include a digital-to-analog converter, mixer, intermediate frequency (IF) components, etc.; the receive circuitry 1220 may include an analog-to-digital converter, mixer, IF components, etc.; the RF circuitry 1222 may include a low-noise amplifier, a power amplifier, power tracking components, etc.; RFFE 1224 may include filters (for example, surface/bulk acoustic wave filters), switches, antenna tuners, beamforming components (for example, phase-array antenna components), etc. The selection and arrangement of the components of the transmit circuitry 1218, receive circuitry 1220, RF circuitry 1222, RFFE 1224, and antenna panels 1226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1214 may include one or more instances of control circuitry (not shown) to provide control functions for the transmit/receive components.

A UE reception may be established by and via the antenna panels 1226, RFFE 1224, RF circuitry 1222, receive circuitry 1220, digital baseband circuitry 1216, and protocol processing circuitry 1214. In some embodiments, the antenna panels 1226 may receive a transmission from the AN 1204 by receive-beamforming signals received by a plurality of antennas/antenna elements of the one or more antenna panels 1226.

A UE transmission may be established by and via the protocol processing circuitry 1214, digital baseband circuitry 1216, transmit circuitry 1218, RF circuitry 1222, RFFE 1224, and antenna panels 1226. In some embodiments, the transmit components of the UE 1204 may apply a spatial filter to the data to be transmitted to form a transmit beam emitted by the antenna elements of the antenna panels 1226.

Similar to the UE 1202, the AN 1204 may include a host platform 1228 coupled with a modem platform 1230. The host platform 1228 may include application processing circuitry 1232 coupled with protocol processing circuitry 1234 of the modem platform 1230. The modem platform may further include digital baseband circuitry 1236, transmit circuitry 1238, receive circuitry 1240, RF circuitry 1242, RFFE circuitry 1244, and antenna panels 1246. The components of the AN 1204 may be similar to and substantially interchangeable with like-named components of the UE 1202. In addition to performing data transmission/reception as described above, the components of the AN 1208 may perform various logical functions that include, for example, RNC functions such as radio bearer management, uplink and downlink dynamic radio resource management, and data packet scheduling.

Figure 13:
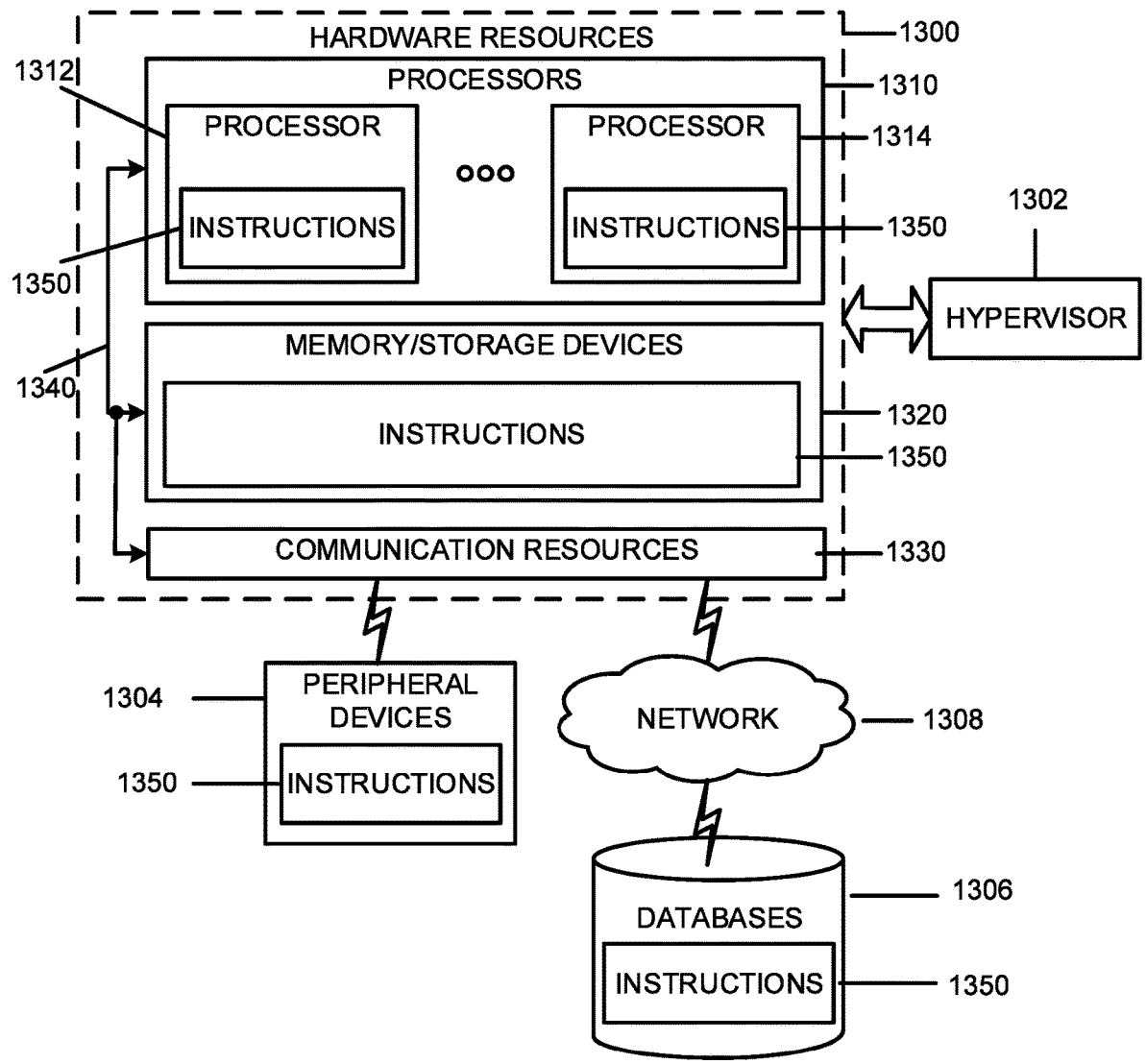
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340 or other interface circuitry. For embodiments where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processors 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface controllers, components, or other suitable devices to communicate with one or more peripheral devices 1304 or one or more databases 1306 or other network elements via a network 1308. For example, the communication resources 1330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

ADDITIONAL NOTES AND EXAMPLES

Example 1 includes an apparatus for an Access Node (AN), comprising: radio frequency (RF) interface circuitry; and processing circuitry coupled with the interface circuitry and configured to: multiplex one or more physical downlink control channels (PDCCHs) carrying downlink control information (DCI) for a User Equipment (UE) in a time division multiplexing (TDM) manner; perform a resource mapping to map the multiplexed one or more PDCCHs into frequency and time resources in a control resource set (CORESET); and provide the multiplexed one or more PDCCHs to the RF interface circuitry for transmission to the UE with the frequency and time resources in the CORESET.

Example 2 includes the apparatus of Example 1, wherein the one or more PDCCHs are respectively transmitted in one or more different Discrete Fourier Transform-spread-OFDM (DFT-s-OFDM) symbols in the CORESET.

Example 3 includes the apparatus of Example 1, wherein the processing circuitry is further configured to: encode a shared Demodulation Reference Signal (DMRS) for the one or more PDCCHs; and provide the shared DMRS to the RF interface circuitry for transmission to the UE with the frequency and time resources in the CORESET.

Example 4 includes the apparatus of Example 3, wherein a frequency resource allocated to the shared DMRS is same as a frequency resource allocated to each of the one or more PDCCHs.

Example 5 includes the apparatus of Example 3, wherein a frequency resource allocated to the shared DMRS spans all the frequency resource in the CORESET.

Example 6 includes the apparatus of Example 3, wherein a frequency resource allocated to the shared DMRS includes frequency resources allocated to the one or more PDCCHs.

Example 7 includes the apparatus of Example 3, wherein a frequency resource allocated to the shared DMRS is same as or larger than a union of frequency resources allocated to the one or more PDCCHs.

Example 8 includes the apparatus of Example 3, wherein a frequency resource allocated to the shared DMRS is same as or proportional to a frequency resource allocated to a PDCCH with a largest aggregation level among the one or more PDCCHs.

Example 9 includes the apparatus of Example 1, wherein a first frequency resource allocated to a first PDCCH of the one or more PDCCHs fully or partially overlaps with a second frequency resource allocated to a second PDCCH of the one or more PDCCHs.

Example 10 includes the apparatus of Example 1, wherein a first frequency resource allocated to a first PDCCH of the one or more PDCCHs does not overlap with a second frequency resource allocated to a second PDCCH of the one or more PDCCHs.

Example 11 includes the apparatus of Example 1, wherein a first frequency resource allocated to a first PDCCH of the one or more PDCCHs includes a second frequency resource allocated to a second PDCCH of the one or more PDCCHs.

Example 12 includes the apparatus of any of Examples 1 to 11, wherein a same aggregation level is applied for the one or more PDCCHs.

Example 13 includes the apparatus of any of Examples 1 to 11, wherein a first aggregation level for a first PDCCH of the one or more PDCCHs is $2^N$ times a second aggregation level for a second PDCCH of the one or more PDCCHs.

Example 14 includes the apparatus of any of Examples 1 to 11, wherein a linkage between aggregation levels for the one or more PDCCHs is configured by higher layers via remaining minimum system information (RMSI), other system information (OSI) or dedicated radio resource control (RRC) signaling.

Example 15 includes the apparatus of Example 1, wherein the processing circuitry is configured to multiplex the one or more PDCCHs by: appending a Cyclic Redundancy Check (CRC) code to one or more DCIs respectively carried in the one or more PDCCHs; concatenating the CRC appended one or more DCIs and perform a joint channel coding on the concatenated DCIs; and performing a same Discrete Fourier Transform (DFT) operation for the concatenated and coded DCIs after rate matching and modulation to provide the multiplexed one or more PDCCHs.

Example 16 includes the apparatus of Example 15, wherein the one or more PDCCHs are transmitted in one or more same Discrete Fourier Transform-spread-OFDM (DFT-s-OFDM) symbols in the CORESET.

Example 17 includes the apparatus of Example 15, wherein a DFT size for the DFT operation is configured by higher layers via remaining minimum system information (RMSI), other system information (OSI) or radio resource control (RRC) signaling.

Example 18 includes the apparatus of Example 15, wherein a DFT size for the DFT operation is determined in accordance with aggregation levels for the one or more PDCCHs.

Example 19 includes the apparatus of any of Examples 1 to 18, wherein the DCI comprises a joint DCI comprising one or more downlink (DL) or uplink (UL) grants.

Example 20 includes the apparatus of Example 19, wherein a number of the one or more DL or UL grants in the joint DCI is configured by higher layers via remaining minimum system information (RMSI), other system information (OSI) or radio resource control (RRC) signaling.

Example 21 includes the apparatus of Example 19, wherein the DCI comprises a field of Identifier for DCI formats to indicate a DCI format of the DCI, and the DCI format comprises a new DCI format for indicating a type of the one or more DL or UL grants and a number of the one or more DL or UL grants.

Example 22 includes the apparatus of Example 19, wherein the joint DCI is concatenated based on one or more fallback DCIs or based on one or more non-fallback DCIs.

Example 23 includes the apparatus of Example 19, wherein a size of the joint DCI is matched with a size of a DCI of a common DCI format by zero padding.

Example 24 includes the apparatus of Example 19, wherein the joint DCI comprises a common field for the one or more DL or UL grants that is used to jointly indicate scheduling of one or more DL or UL transmissions.

Example 25 includes the apparatus of Example 24, wherein the common field comprises an identifier for the joint DCI to indicate a type of the one or more DL or UL grants and a number of the one or more DL or UL grants.

Example 26 includes a method to be performed at an Access Node (AN), comprising: multiplexing one or more physical downlink control channels (PDCCHs) carrying downlink control information (DCI) for a User Equipment (UE) in a time division multiplexing (TDM) manner; performing a resource mapping to map the multiplexed one or more PDCCHs into frequency and time resources in a control resource set (CORESET); and transmitting the multiplexed one or more PDCCHs to the UE with the frequency and time resources in the CORESET.

Example 27 includes the method of Example 26, wherein the one or more PDCCHs are respectively transmitted in one or more different Discrete Fourier Transform-spread-OFDM (DFT-s-OFDM) symbols in the CORESET.

Example 28 includes the method of Example 26, further comprising: encoding a shared Demodulation Reference Signal (DMRS) for the one or more PDCCHs; and transmitting the shared DMRS to the UE with the frequency and time resources in the CORESET.

Example 29 includes the method of Example 28, wherein a frequency resource allocated to the shared DMRS is same as a frequency resource allocated to each of the one or more PDCCHs.

Example 30 includes the method of Example 28, wherein a frequency resource allocated to the shared DMRS spans all the frequency resource in the CORESET.

Example 31 includes the method of Example 28, wherein a frequency resource allocated to the shared DMRS includes frequency resources allocated to the one or more PDCCHs.

Example 32 includes the method of Example 28, wherein a frequency resource allocated to the shared DMRS is same as or larger than a union of frequency resources allocated to the one or more PDCCHs.

Example 33 includes the method of Example 28, wherein a frequency resource allocated to the shared DMRS is same as or proportional to a frequency resource allocated to a PDCCH with a largest aggregation level among the one or more PDCCHs.

Example 34 includes the method of Example 26, wherein a first frequency resource allocated to a first PDCCH of the one or more PDCCHs fully or partially overlaps with a second frequency resource allocated to a second PDCCH of the one or more PDCCHs.

Example 35 includes the method of Example 26, wherein a first frequency resource allocated to a first PDCCH of the one or more PDCCHs does not overlap with a second frequency resource allocated to a second PDCCH of the one or more PDCCHs.

Example 36 includes the method of Example 26, wherein a first frequency resource allocated to a first PDCCH of the one or more PDCCHs includes a second frequency resource allocated to a second PDCCH of the one or more PDCCHs.

Example 37 includes the method of any of Examples 26 to 36, wherein a same aggregation level is applied for the one or more PDCCHs.

Example 38 includes the method of any of Examples 26 to 36, wherein a first aggregation level for a first PDCCH of the one or more PDCCHs is $2^N$ times a second aggregation level for a second PDCCH of the one or more PDCCHs.

Example 39 includes the method of any of Examples 26 to 36, wherein a linkage between aggregation levels for the one or more PDCCHs is configured by higher layers via remaining minimum system information (RMSI), other system information (OSI) or dedicated radio resource control (RRC) signaling.

Example 40 includes the method of Example 26, wherein multiplexing the one or more PDCCHs comprises: appending a Cyclic Redundancy Check (CRC) code to one or more DCIs respectively carried in the one or more PDCCHs; concatenating the CRC appended one or more DCIs and perform a joint channel coding on the concatenated DCIs; and performing a same Discrete Fourier Transform (DFT) operation for the concatenated and coded DCIs after rate matching and modulation to provide the multiplexed one or more PDCCHs.

Example 41 includes the method of Example 40, wherein the one or more PDCCHs are transmitted in one or more same Discrete Fourier Transform-spread-OFDM (DFT-s-OFDM) symbols in the CORESET.

Example 42 includes the method of Example 40, wherein a DFT size for the DFT operation is configured by higher layers via remaining minimum system information (RMSI), other system information (OSI) or radio resource control (RRC) signaling.

Example 43 includes the method of Example 40, wherein a DFT size for the DFT operation is determined in accordance with aggregation levels for the one or more PDCCHs.

Example 44 includes the method of any of Examples 26 to 43, wherein the DCI comprises a joint DCI comprising one or more downlink (DL) or uplink (UL) grants.

Example 45 includes the method of Example 44, wherein a number of the one or more DL or UL grants in the joint DCI is configured by higher layers via remaining minimum system information (RMSI), other system information (OSI) or radio resource control (RRC) signaling.

Example 46 includes the method of Example 44, wherein the DCI comprises a field of Identifier for DCI formats to indicate a DCI format of the DCI, and the DCI format comprises a new DCI format for indicating a type of the one or more DL or UL grants and a number of the one or more DL or UL grants.

Example 47 includes the method of Example 44, wherein the joint DCI is concatenated based on one or more fallback DCIs or based on one or more non-fallback DCIs.

Example 48 includes the method of Example 44, wherein a size of the joint DCI is matched with a size of a DCI of a common DCI format by zero padding.

Example 49 includes the method of Example 44, wherein the joint DCI comprises a common field for the one or more DL or UL grants that is used to jointly indicate scheduling of one or more DL or UL transmissions.

Example 50 includes the method of Example 44, wherein the common field comprises an identifier for the joint DCI to indicate a type of the one or more DL or UL grants and a number of the one or more DL or UL grants.

Example 51 includes an apparatus for a User Equipment (UE), comprising: radio frequency (RF) interface circuitry; and processing circuitry coupled with the RF interface circuitry and configured to: decode one or more physical downlink control channels (PDCCHs) received from an Access Node (AN) via the RF interface circuitry; and identify downlink control information (DCI) carried in the one or more PDCCHs, wherein the one or more PDCCHs are multiplexed in a time division multiplexing (TDM) manner and transmitted with frequency and time resources in a control resource set (CORESET).

Example 52 includes the apparatus of Example 51, wherein the one or more PDCCHs are respectively transmitted in one or more different Discrete Fourier Transform-spread-OFDM (DFT-s-OFDM) symbols in the CORESET.

Example 53 includes the apparatus of Example 51, wherein the processing circuitry is further configured to: decode a shared Demodulation Reference Signal (DMRS) for the one or more PDCCHs received from the AN via the RF interface circuitry; and decode the one or more PDCCHs based on the shared DMRS.

Example 54 includes the apparatus of Example 53, wherein a frequency resource allocated to the shared DMRS is same as a frequency resource allocated to each of the one or more PDCCHs.

Example 55 includes the apparatus of Example 53, wherein a frequency resource allocated to the shared DMRS spans all the frequency resource in the CORESET.

Example 56 includes the apparatus of Example 53, wherein a frequency resource allocated to the shared DMRS includes frequency resources allocated to the one or more PDCCHs.

Example 57 includes the apparatus of Example 53, wherein a frequency resource allocated to the shared DMRS is same as or larger than a union of frequency resources allocated to the one or more PDCCHs.

Example 58 includes the apparatus of Example 53, wherein a frequency resource allocated to the shared DMRS is same as or proportional to a frequency resource allocated to a PDCCH with a largest aggregation level among the one or more PDCCHs.

Example 59 includes the apparatus of Example 51, wherein a first frequency resource allocated to a first PDCCH of the one or more PDCCHs fully or partially overlaps with a second frequency resource allocated to a second PDCCH of the one or more PDCCHs.

Example 60 includes the apparatus of Example 51, wherein a first frequency resource allocated to a first PDCCH of the one or more PDCCHs does not overlap with a second frequency resource allocated to a second PDCCH of the one or more PDCCHs.

Example 61 includes the apparatus of Example 51, wherein a first frequency resource allocated to a first PDCCH of the one or more PDCCHs includes a second frequency resource allocated to a second PDCCH of the one or more PDCCHs.

Example 62 includes the apparatus of any of Examples 51 to 61, wherein a same aggregation level is applied for the one or more PDCCHs.

Example 63 includes the apparatus of any of Examples 51 to 61, wherein a first aggregation level for a first PDCCH of the one or more PDCCHs is $2^N$ times a second aggregation level for a second PDCCH of the one or more PDCCHs.

Example 64 includes the apparatus of any of Examples 51 to 61, wherein a linkage between aggregation levels for the one or more PDCCHs is configured by higher layers via remaining minimum system information (RMSI), other system information (OSI) or dedicated radio resource control (RRC) signaling.

Example 65 includes the apparatus of Example 51, wherein the one or more PDCCHs carry one or more DCIs that are appended with a Cyclic Redundancy Check (CRC) code and concatenated, and the one or more PDCCHs are transmitted in one or more same Discrete Fourier Transform-spread-OFDM (DFT-s-OFDM) symbols in the CORESET.

Example 66 includes the apparatus of Example 65, wherein the processing circuitry is configured to decode the one or more PDCCHs by performing a same Inverse Discrete Fourier Transform (IDFT) operation for the one or more PDCCHs, and identify the one or more DCIs by performing a CRC checking operation with an assumption of aggregation levels for the one or more PDCCHs.

Example 67 includes the apparatus of any of Examples 51 to 66, wherein the DCI comprises a joint DCI comprising one or more downlink (DL) or uplink (UL) grants.

Example 68 includes the apparatus of Example 67, wherein a number of the one or more DL or UL grants in the joint DCI is configured by higher layers via remaining minimum system information (RMSI), other system information (OSI) or radio resource control (RRC) signaling.

Example 69 includes the apparatus of Example 67, wherein the DCI comprises a field of Identifier for DCI formats to indicate a DCI format of the DCI, and the DCI format comprises a new DCI format for indicating a type of the one or more DL or UL grants and a number of the one or more DL or UL grants.

Example 70 includes the apparatus of Example 67, wherein the joint DCI is concatenated based on one or more fallback DCIs or based on one or more non-fallback DCIs.

Example 71 includes the apparatus of Example 67, wherein a size of the joint DCI is matched with a size of a DCI of a common DCI format by zero padding.

Example 72 includes the apparatus of Example 67, wherein the joint DCI comprises a common field for the one or more DL or UL grants that is used to jointly indicate scheduling of one or more DL or UL transmissions.

Example 73 includes the apparatus of Example 72, wherein the common field comprises an identifier for the joint DCI to indicate a type of the one or more DL or UL grants and a number of the one or more DL or UL grants.

Example 74 includes a method to be performed at a User Equipment (UE), comprising: decoding one or more physical downlink control channels (PDCCHs) received from an Access Node (AN); and identifying downlink control information (DCI) carried in the one or more PDCCHs, wherein the one or more PDCCHs are multiplexed in a time division multiplexing (TDM) manner and transmitted with frequency and time resources in a control resource set (CORESET).

Example 75 includes the method of Example 74, wherein the one or more PDCCHs are respectively transmitted in one or more different Discrete Fourier Transform-spread-OFDM (DFT-s-OFDM) symbols in the CORESET.

Example 76 includes the method of Example 74, further comprising: decoding a shared Demodulation Reference Signal (DMRS) for the one or more PDCCHs received from the AN; and decoding the one or more PDCCHs based on the shared DMRS.

Example 77 includes the method of Example 76, wherein a frequency resource allocated to the shared DMRS is same as a frequency resource allocated to each of the one or more PDCCHs.

Example 78 includes the method of Example 76, wherein a frequency resource allocated to the shared DMRS spans all the frequency resource in the CORESET.

Example 79 includes the method of Example 76, wherein a frequency resource allocated to the shared DMRS includes frequency resources allocated to the one or more PDCCHs.

Example 80 includes the method of Example 76, wherein a frequency resource allocated to the shared DMRS is same as or larger than a union of frequency resources allocated to the one or more PDCCHs.

Example 81 includes the method of Example 76, wherein a frequency resource allocated to the shared DMRS is same as or proportional to a frequency resource allocated to a PDCCH with a largest aggregation level among the one or more PDCCHs.

Example 82 includes the method of Example 74, wherein a first frequency resource allocated to a first PDCCH of the one or more PDCCHs fully or partially overlaps with a second frequency resource allocated to a second PDCCH of the one or more PDCCHs.

Example 83 includes the method of Example 74, wherein a first frequency resource allocated to a first PDCCH of the one or more PDCCHs does not overlap with a second frequency resource allocated to a second PDCCH of the one or more PDCCHs.

Example 84 includes the method of Example 74, wherein a first frequency resource allocated to a first PDCCH of the one or more PDCCHs includes a second frequency resource allocated to a second PDCCH of the one or more PDCCHs.

Example 85 includes the method of any of Examples 74 to 84, wherein a same aggregation level is applied for the one or more PDCCHs.

Example 86 includes the method of any of Examples 74 to 84, wherein a first aggregation level for a first PDCCH of the one or more PDCCHs is $2^N$ times a second aggregation level for a second PDCCH of the one or more PDCCHs.

Example 87 includes the method of any of Examples 74 to 84, wherein a linkage between aggregation levels for the one or more PDCCHs is configured by higher layers via remaining minimum system information (RMSI), other system information (OSI) or dedicated radio resource control (RRC) signaling.

Example 88 includes the method of Example 74, wherein the one or more PDCCHs carry one or more DCIs that are appended with a Cyclic Redundancy Check (CRC) code and concatenated, and the one or more PDCCHs are transmitted in one or more same Discrete Fourier Transform-spread-OFDM (DFT-s-OFDM) symbols in the CORESET.

Example 89 includes the method of Example 88, wherein decoding the one or more PDCCHs comprises performing a same Inverse Discrete Fourier Transform (IDFT) operation for the one or more PDCCHs, and identifying the one or more DCIs comprises performing a CRC checking operation with an assumption of aggregation levels for the one or more PDCCHs.

Example 90 includes the method of any of Examples 74 to 89, wherein the DCI comprises a joint DCI comprising one or more downlink (DL) or uplink (UL) grants.

Example 91 includes the method of Example 90, wherein a number of the one or more DL or UL grants in the joint DCI is configured by higher layers via remaining minimum system information (RMSI), other system information (OSI) or radio resource control (RRC) signaling.

Example 92 includes the method of Example 90, wherein the DCI comprises a field of Identifier for DCI formats to indicate a DCI format of the DCI, and the DCI format comprises a new DCI format for indicating a type of the one or more DL or UL grants and a number of the one or more DL or UL grants.

Example 93 includes the method of Example 90, wherein the joint DCI is concatenated based on one or more fallback DCIs or based on one or more non-fallback DCIs.

Example 94 includes the method of Example 90, wherein a size of the joint DCI is matched with a size of a DCI of a common DCI format by zero padding.

Example 95 includes the method of Example 90, wherein the joint DCI comprises a common field for the one or more DL or UL grants that is used to jointly indicate scheduling of one or more DL or UL transmissions.

Example 96 includes the method of Example 95, wherein the common field comprises an identifier for the joint DCI to indicate a type of the one or more DL or UL grants and a number of the one or more DL or UL grants.

Example 97 includes a computer-readable medium having instructions stored thereon, wherein the instructions, when executed by processing circuitry of an Access Node (AN), cause the processing circuitry to perform the method of any of Examples 26-50.

Example 98 includes an apparatus for an Access Node (AN) comprising means for performing the actions of the method of any of Examples 26-50.

Example 99 includes a computer-readable medium having instructions stored thereon, wherein the instructions, when executed by processing circuitry of a User Equipment (UE), cause the processing circuitry to perform the method of any of Examples 74-96.

Example 100 includes an apparatus for a User Equipment (UE), comprising means for performing the actions of the method of any of Examples 74-96.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus, comprising:
   radio frequency (RF) interface circuitry; and
   processing circuitry coupled with the interface circuitry and configured to:
   multiplex one or more physical downlink control channels (PDCCHs) carrying downlink control information (DCI) for a User Equipment (UE) in a time division multiplexing (TDM) manner;
   perform a resource mapping to map the multiplexed one or more PDCCHs into frequency and time resources in a control resource set (CORESET); and
   provide the multiplexed one or more PDCCHs to the RF interface circuitry for transmission to the UE with the frequency and time resources in the CORESET,
   wherein the one or more PDCCHs are respectively transmitted in one or more Discrete Fourier Transform-spread-OFDM (DFT-s-OFDM) symbols maintaining a single carrier property in the CORESET.

2. The apparatus of claim 1, wherein the processing circuitry is further configured to:
   encode a shared Demodulation Reference Signal (DMRS) for the one or more PDCCHs; and
   provide the shared DMRS to the RF interface circuitry for transmission to the UE with the frequency and time resources in the CORESET.

3. The apparatus of claim 2, wherein a frequency resource allocated to the shared DMRS is same as a frequency resource allocated to each of the one or more PDCCHs.

4. The apparatus of claim 2, wherein a frequency resource allocated to the shared DMRS spans all the frequency resource in the CORESET.

5. The apparatus of claim 2, wherein a frequency resource allocated to the shared DMRS includes frequency resources allocated to the one or more PDCCHs.

6. The apparatus of claim 2, wherein a frequency resource allocated to the shared DMRS is same as or larger than a union of frequency resources allocated to the one or more PDCCHs.

7. The apparatus of claim 2, wherein a frequency resource allocated to the shared DMRS is same as or proportional to a frequency resource allocated to a PDCCH with a largest aggregation level among the one or more PDCCHs.

8. The apparatus of claim 1, wherein a first frequency resource allocated to a first PDCCH of the one or more PDCCHs fully or partially overlaps with a second frequency resource allocated to a second PDCCH of the one or more PDCCHs.

9. The apparatus of claim 1, wherein a first frequency resource allocated to a first PDCCH of the one or more PDCCHs does not overlap with a second frequency resource allocated to a second PDCCH of the one or more PDCCHs.

10. The apparatus of claim 1, wherein a first frequency resource allocated to a first PDCCH of the one or more PDCCHs includes a second frequency resource allocated to a second PDCCH of the one or more PDCCHs.

11. The apparatus of claim 1, wherein a same aggregation level is applied for the one or more PDCCHs.

12. The apparatus of claim 1, wherein a first aggregation level for a first PDCCH of the one or more PDCCHs is $2^N$ times a second aggregation level for a second PDCCH of the one or more PDCCHs.

13. The apparatus of claim 1, wherein a linkage between aggregation levels for the one or more PDCCHs is configured by higher layers via remaining minimum system information (RMSI), other system information (OSI) or dedicated radio resource control (RRC) signaling.

14. The apparatus of claim 1, wherein the processing circuitry is configured to multiplex the one or more PDCCHs by:
    appending a Cyclic Redundancy Check (CRC) code to one or more DCIs respectively carried in the one or more PDCCHs;
    concatenating the CRC appended one or more DCIs and perform a joint channel coding on the concatenated DCIs; and
    performing a same Discrete Fourier Transform (DFT) operation for the concatenated and coded DCIs after rate matching and modulation to provide the multiplexed one or more PDCCHs.

15. The apparatus of claim 14, wherein a DFT size for the DFT operation is configured by higher layers via remaining minimum system information (RMSI), other system information (OSI) or radio resource control (RRC) signaling.

16. The apparatus of claim 14, wherein a DFT size for the DFT operation is determined in accordance with aggregation levels for the one or more PDCCHs.

17. The apparatus of claim 1, wherein the DCI comprises a joint DCI comprising one or more downlink (DL) or uplink (UL) grants.

18. The apparatus of claim 17, wherein a number of the one or more DL or UL grants in the joint DCI is configured by higher layers via remaining minimum system information (RMSI), other system information (OSI) or radio resource control (RRC) signaling.

19. The apparatus of claim 17, wherein the DCI comprises a field of Identifier for DCI formats to indicate a DCI format of the DCI, and the DCI format comprises a new DCI format for indicating a type of the one or more DL or UL grants and a number of the one or more DL or UL grants.

20. The apparatus of claim 17, wherein the joint DCI is concatenated based on one or more fallback DCIs or based on one or more non-fallback DCIs.

21. The apparatus of claim 17, wherein a size of the joint DCI is matched with a size of a DCI of a common DCI format by zero padding.

22. The apparatus of claim 17, wherein the joint DCI comprises a common field for the one or more DL or UL grants that is used to jointly indicate scheduling of one or more DL or UL transmissions.

23. The apparatus of claim 22, wherein the common field comprises an identifier for the joint DCI to indicate a type of the one or more DL or UL grants and a number of the one or more DL or UL grants.

* * * * *